US010515666B2

(12) United States Patent
Sreedhara

(10) Patent No.: US 10,515,666 B2
(45) Date of Patent: Dec. 24, 2019

(54) SYSTEMS AND METHODS FOR DETERMINING PLAYBACK POINTS IN MEDIA ASSETS

(71) Applicant: Rovi Guides, Inc., San Jose, CA (US)

(72) Inventor: Arun Sreedhara, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/198,053

(22) Filed: Nov. 21, 2018

(65) Prior Publication Data

US 2019/0172498 A1    Jun. 6, 2019

Related U.S. Application Data

(63) Continuation of application No. 15/655,219, filed on Jul. 20, 2017, now Pat. No. 10,176,846.

(51) Int. Cl.
| | |
|---|---|
| *G11B 27/10* | (2006.01) |
| *H04N 21/858* | (2011.01) |
| *H04N 21/8547* | (2011.01) |
| *H04N 21/482* | (2011.01) |
| *H04N 21/45* | (2011.01) |
| *G06F 16/73* | (2019.01) |
| *G06F 16/74* | (2019.01) |
| *H04N 21/8405* | (2011.01) |
| *H04N 21/472* | (2011.01) |
| *H04N 21/435* | (2011.01) |
| *H04N 21/44* | (2011.01) |

(52) U.S. Cl.
CPC ............ *G11B 27/102* (2013.01); *G06F 16/73* (2019.01); *G06F 16/74* (2019.01); *H04N 21/435* (2013.01); *H04N 21/44008* (2013.01); *H04N 21/4532* (2013.01); *H04N 21/47217* (2013.01); *H04N 21/4828* (2013.01); *H04N 21/8405* (2013.01); *H04N 21/858* (2013.01); *H04N 21/8547* (2013.01)

(58) Field of Classification Search
USPC .................................................. 386/239–248
See application file for complete search history.

(56) References Cited

U.S. PATENT DOCUMENTS

| | | | |
|---|---|---|---|
| 2015/0110468 A1* | 4/2015 | Abecassis | H04N 21/4126 386/241 |
| 2015/0177953 A1* | 6/2015 | Khalsa | H04N 21/47205 715/716 |

* cited by examiner

*Primary Examiner* — Hung Q Dang
(74) *Attorney, Agent, or Firm* — Haley Guiliano LLP

(57) ABSTRACT

Systems and methods are described for determining playback points in media assets based on both a keyword and a context of a current playback point in a media asset. For example, in response to user input of a keyword (e.g., "Matt Damon") while the user is consuming a media asset, a current playback point in the media asset is determined. Context of the media asset at the current playback point is then determined (e.g., the current playback point involves a car chase). Playback points in the media asset are determined that match both the context and the keyword and are presented to the user (e.g., playback points with Matt Damon in a car chase).

20 Claims, 9 Drawing Sheets

SYSTEMS AND METHODS FOR DETERMINING PLAYBACK POINTS IN MEDIA ASSETS

CROSS-REFERENCE TO RELATED APPLICATION

This application is a continuation of U.S. patent application Ser. No. 15/655,219, filed Jul. 20, 2017, now pending, which is hereby incorporated by reference herein in its entirety.

BACKGROUND

Given the plethora of media content available to consumers, many consumers may desire to watch only portions of media content that are interesting to them. For example, a user may enjoy scenes with a particular actor, such as Tom Cruise. Conventional systems may identify playback points where the particular actor (e.g., Tom Cruise) appears in a media asset and present the playback points to the user. The conventional systems may allow the user to skip to one of the playback points where the particular actor appears and play the media asset from that point. However, in many cases the number of playback points may be overwhelming to the user. For example, Tom Cruise may appear in the vast majority of a particular media asset and thus the user may have trouble choosing a playback point that he or she is interested in.

SUMMARY

Accordingly, systems and methods are presented herein for determining playback points in media assets based on both a keyword and a context of a current playback point in a media asset. For example, while consuming a media asset, a user may input a keyword (e.g., the text "Tom Cruise"). In response to the user input of the keyword, a current playback point in the media asset is determined and context of the media asset at the current playback point is determined (e.g., the current playback point involves a car chase). Playback points are determined that match both the context and the keyword and are presented to the user (e.g., playback points with Tom Cruise in a car chase).

In some aspects, a media guidance application may generate for display a media asset. For example, the media guidance application may generate for display the movie, "Edge of Tomorrow" on a display screen (e.g., of a tablet or television). In some embodiments, the media guidance application may generate a media asset for display in response to receiving a user selection of the media asset (e.g., via a user input interface such as a touch screen).

The media guidance application may receive, while generating for display the media asset, a keyword from a user. For example, the media guidance application may receive text, graphics, or a combination that identify at least one characteristic of the media asset. The characteristic may be any metadata relating to the media asset, such as a person associated with the media asset (e.g., actor, director, producer, etc.) and/or an identifier of the action (e.g., "car chase,"), and/or an identifier of a location (e.g., "Paris"). In some embodiments, the media guidance application may generate for display a field for text input of the keyword. For example, using a remote control, the user may input a string of characters (e.g., "Tom Cruise") which the media guidance application receives as the keyword. In some embodiments, the media guidance application may generate for display suggested and/or popular search terms in response to a user request to perform a search while consuming the media asset. For example, the user may select a "search" button on a remote control and indicators containing graphics (e.g., a picture of Tom Cruise) and/or text for keywords may be generated for display. The media guidance application may receive a user selection of one of the indicators and determine the keyword based on the selection.

In some embodiments, the indicators are generated either as an overlay of the media asset or in a separate section of the display from the media asset. For example, the media guidance application may generate indicators of keywords for the user to select on the right side of a display screen and the media asset on the left side. Alternatively or additionally, the media guidance application may overlay the keywords on the media asset. The media guidance application may generate for display translucent indicators to allow a user to view the media asset. In some embodiments, the media guidance application may dynamically update the indicators based on the current playback point in the media asset. For example, in scenes with Tom Cruise, different keywords may be more commonly selected than scenes with Emily Blunt so some or all indicators may be swapped depending on which actor is in the media asset at the current playback point.

In some embodiments, the media guidance application may generate for display a plurality of indicators for attributes of the media asset. For example, the media guidance application may generate a series of graphics associated with attributes of the media asset. As a specific example, one graphic may include a headshot of the actor Emily Blunt and another graphic may include a picture of the Eiffel Tower (e.g., representing Paris) as both Emily Blunt and Paris are attributes of the media asset currently being generated for display. The media guidance application may generate uniformly shaped indicators (e.g., circles of the same size) or vary the shapes and sizes of the indicators based on the properties of the graphics. For example, in order to avoid distortion, the media guidance application may generate graphics in the same aspect ratio as their source files. Alternatively or additionally, the media guidance application may generate indicators of different sizes based on the popularity of the associated attribute. For example, the media guidance application may access a database and determine that users have searched for Tom Cruise one million more times than Emily Blunt. The media guidance application may accordingly generate for display a larger indicator with a headshot of Tom Cruise than one of Emily Blunt.

The media guidance application may receive a user input from the user selecting a first indicator associated with a first attribute. For example, the media guidance application may receive a user input (e.g., via a user input interface such as a touch screen on a tablet) of a particular indicator. As a specific example, the media guidance application may receive a user input selecting a graphic with a headshot of Tom Cruise. The media guidance application may, in response to receiving the user input selecting the first indicator, determine that the first attribute is the keyword. For example, upon determining that the user has selected an indicator with a headshot of Tom Cruise, the media guidance application may determine that "Tom Cruise," the attribute associated with the indicator, is the keyword that the user desires to search for.

In some embodiments, the media guidance application may generate indicators for categories of attributes associated with the media asset. After receiving a selection of a category of attributes, the media guidance application may generate indicators associated with the category, which may allow for more efficient use of display space in display constrained environments. Specifically, the media guidance application may, in response to receiving the keyword from the user, compare attributes of the keyword with attributes of each of a plurality of keywords related to the media asset. For example, the media guidance application may generate for display indicators for general categories of attributes associated with the media asset, such as "actors," "locations," and/or "scene type." The general category indicators may be for any keyword that has associated sub-keywords associated with the media asset. For example, "Tom Cruise" may be associated with "Tom Cruise running," "Tom Cruise fighting," "Tom Cruise sleeping," etc. and thus constitutes a general category. The media guidance application may determine to generate indicators for categories if there is a large number of attributes that could not fit on the display without obscuring the media asset. Upon receiving a selection from the user of a particular keyword (e.g., such as the category actor), the media guidance application may compare each attribute associated with the media asset to the selected keyword. For example, upon selection of an indicator that corresponds to an "actor" category, the media guidance application may, via character comparison with attributes of the media asset, determine which attributes are actors. The media guidance application may determine a subset of the plurality of keywords that have an attribute that matches an attribute of the keyword. For example, the media guidance application may determine that there are five actors associated with the media asset "Edge of Tomorrow." Specifically, the media guidance application may determine the subset based on retrieving attributes, either locally or from a remote server, and comparing metadata associated with the attributes with the keyword.

The media guidance application may generate for display the subset of the plurality of keywords. As one example, the media guidance application may generate indicators overlaid or in a separate section of the same display on which the media asset is also being generated for displayed. After receiving the selection of the keyword and determining the subset of related keywords, the media guidance application may generate for display new indicators with the subset of the plurality of keywords instead of the keywords (e.g., for the categories) that were initially generated. As a specific example, indicators for "actor" and "location" may be replaced by specific actors (e.g., Tom Cruise and Emily Blunt) after a selection of "actor." Alternatively or additionally, the selected indicator may continue to be generated for display and the subset of the plurality of keywords may be generated for display radially around the selected keyword. In this example, the media guidance application may cease generating for display unselected keywords. Upon receiving a selection of one of the plurality of keywords, the media guidance application may determine the keyword that the user desires to search for in the media asset. In this way, the media guidance application may provide the user with more specific keywords via categories to better target specific playback points the user is interested in, while also conserving display space.

The media guidance application, in response to receiving the keyword from the user may determine a context in the media asset being generated for display. Specifically, the media guidance application may determine a current playback point in the media asset. For example, the media guidance application may retrieve a time code (e.g., "00:30: 00:00", in the format hours:minutes:seconds:frames) corresponding to the current playback point in the media asset (e.g., 30 minutes into the media asset). The media guidance application may retrieve the time code from a time code signal in the media asset containing a set of binary coded decimal values referring to the present playback position in the media asset. For example, the media guidance application may determine that a particular signal or header in a data packet contains binary coded decimal values and retrieve those values. The media guidance application converts each binary coded decimal value to a corresponding decimal value corresponding to the time code. For example, the media guidance application may determine that four particular bits relating to one value in the time code are "1001" which may correspond to the value "9" in the time code.

The media guidance application may retrieve metadata associated with the current playback point. For example, the media guidance application may retrieve metadata associated with the current playback point from local storage or a remote server. The metadata may be organized in a table or other data structure. For example, the media guidance application may retrieve a data structure specific to the media asset currently being generated for display. The metadata may be organized in a table, where each row of the table relates to a particular playback point or range of playback points and each field in the row contains a particular value (e.g., a string of characters). The values may be any character or string of characters that describe the current playback point in the media asset. For example, the metadata may be a song currently playing in the media asset, a location of a scene in the media asset, a general description of the current action (e.g., "car chase"), or an actor appearing at that time in the media asset. The media guidance application may compare the value for the current playback point (e.g., a time code) with values in the data structure storing metadata associated with playback points in the media asset. The media guidance application may determine, based on the comparison, a particular field or fields of metadata that relate to the media asset at the current playback point. For example, the media guidance application may determine that the current playback point of 30 minutes into the movie, "Edge of Tomorrow" matches a stored playback point in the data structure and may retrieve the string, "Tom Cruise" from an associated field.

The media guidance application may assign a context based on the retrieved metadata associated with the current playback point. For example, the media guidance application may use the metadata at the current playback point to assign context to the keyword that the user has searched for. Specifically, the media guidance application may use the context as a filtering criterion to lower the number of results returned for the keyword and thus provide the user with more meaningful results. In some embodiments, multiple metadata values may be returned for a given playback point. The media guidance application may, in this situation, use some, all, or only a single one as the filtering criteria. The media guidance application may choose which context to assign based on a user profile (e.g., the user likes Tom Cruise, so it is assigned as the context) and/or the number of results returned (e.g., if one context would lead to zero results when combined with the keyword, another context may be assigned).

In some embodiments, the media guidance application may receive multiple keywords that the user desires to search for, which may also be used to determine the context. Specifically, the media guidance application may receive, while generating for display the media asset, a second keyword from the user. For example, the media guidance application may receive a user input of "Tom Cruise" and a user input of "Nicole Kidman," two actors in a particular movie being generated for display. The media guidance application may determine, based on characteristics of the first keyword and characteristics of the second keyword, a keyword context linking the first keyword with the second keyword. For example, the media guidance application may access a database either in local storage or at a remote server that includes pairs of keywords and a string of characters that links the two keywords. For example, the media guidance application may determine that the database includes an entry, which may be specific to the media asset, that "Tom Cruise" and "Nichole Kidman" are "romantic interests." The media guidance application may assign a default linking context or no linking context if one does not exist for two keywords in the database. The media guidance application may assign the context based on both (1) the keyword context and (2) the retrieved metadata associated with the current playback point. For example, the media guidance application may determine that there are multiple contexts from the retrieved metadata that is associated with the current playback point. By using the keyword context, the media guidance application may be able to select the context desired by the user and search for playback points that correspond to the desired context. As a specific example, if the media guidance application determines that, from the retrieved metadata, the context could be "romantic" or "travel," and that the keyword context is "romantic interests," then the media guidance application may determine the context should be "romantic" since it applies to both the keyword context and the retrieved metadata associated with the playback point. The media guidance application may determine whether the keyword context matches retrieved metadata based on comparing characters of the keyword context with characters of the retrieved metadata.

In some embodiments, the media guidance application may assign the context based on user preferences. Specifically, the media guidance application may determine, based on the retrieved metadata, that a plurality of contexts correspond to the current playback point. For example, the media guidance application may determine that there are multiple contexts from the retrieved metadata that is associated with the current playback point. As a specific example, the media guidance application may search a database for contexts associated with the movie, "Edge of Tomorrow" at a playback point of 30 minutes and retrieve strings of characters, "action" and "gun-fight," corresponding to two contexts at that playback point. The media guidance application may retrieve, from a user profile, a context preference. For example, the media guidance application may access a user profile stored in local storage or at a remote server containing user preferences for particular types of content. As one specific example, the media guidance application may search a viewing history in the user profile and determine that a threshold amount of media assets consumed by the user include a particular context (e.g., "gun-fight") and may determine that the user has a preference for the context. As another example, the media guidance application may determine that there is an explicit preference for a particular context (e.g., stored in a favorites list) stored in the user profile, such as an indication that the user enjoys "car chases."

The media guidance application may determine that the context preference matches a first context of the plurality of contexts. For example, the media guidance application may retrieve one or more context preferences of the user from the user profile and compare characters of each context from the user profile to characters of each of the multiple context preferences for the current playback point. The media guidance application may determine a match based on a threshold percentage (e.g., 90%) of the characters matching between two contexts. The media guidance application may then assign the first context as the context. For example, upon determining that the user has a preference (e.g., based on the user profile) for "gun-fights" and one of the contexts at the current playback point is a "gun-fight" the media guidance application may assign "gun-fight" as the context for search purposes. In some embodiments, multiple contexts may match between the user preferred contexts from the user profile and the current playback point. In this situation, the media guidance application may rank the contexts according to an algorithm to determine which context to assign. For example, the media guidance application may determine that the user has viewed a threshold number of media assets that include "gun-fights" and "magic tricks," which both match a context associated with a current playback point, but that the user has consumed more media assets with "gun-fights" than "magic tricks" and thus assigns "gun-fights" as the context. Alternatively or additionally, the media guidance application may generate a ranking of contexts based on additional factors, such as the popularity of a context described below, when determining which context to assign.

In some embodiments, the media guidance application may assign the context based on the popularity of particular contexts. Specifically, the media guidance application may determine, based on the retrieved metadata, that a plurality of contexts correspond to the current playback point. For example, the media guidance application may determine that there are multiple contexts from the retrieved metadata that is associated with the current playback point. As a specific example, the media guidance application may search a database for contexts associated with the movie, "Edge of Tomorrow" at a playback point of 30 minutes and retrieve strings of characters, "action" and "gun-fight," corresponding to two contexts at that playback point. The media guidance application may retrieve, from a server, an indication of popularity for each of the plurality of contexts. For example, the media guidance application may access a server that includes a data structure of strings corresponding to contexts that are each associated with a popularity value. The media guidance application may compare characters of each of the plurality of contexts with characters of strings corresponding to contexts in the data structure. Upon determining a match, the media guidance application may retrieve, from an associated field, a popularity value. The popularity value may be a ranking (e.g., $3^{rd}$ most popular based on searches in the past month), number (e.g., the number of times the particular context has been searched/requested over a period of time), or any other numeric value that allows two contexts to be differentiated as more or less popular.

The media guidance application may determine, based on the retrieved indication of popularity for each of the plurality of contexts, a most popular context. For example, the media guidance application may compare the retrieved values and determine which value indicates a more popular context. As a specific example, the media guidance application may determine that "gun-fight" has been searched for the $4^{th}$ most by users and "car chase" has been search for the $10^{th}$ most by users over a predetermined period of time and thus determine "gun-fight" is more popular. The media guidance application may assign the most popular context as the context. For example, upon determining that "gun-fight" is the most popular context that is associated with the current playback point, the media guidance application may assign "gun-fight" as the context for search purposes.

The media guidance application may compare both (1) the keyword and (2) the context with a plurality of keywords and contexts associated with playback points in the media asset. For example, the media guidance application may search the data structure containing metadata related to playback points in the media asset for a playback point that is associated with both an identifier of the context and an identifier of the keyword. The media guidance application may compare characters of the context and keyword with characters of contexts and keywords stored in fields of the data structure. If both the context and keyword match values stored in fields for the same playback point, the media guidance application may determine that the playback point is a match.

The media guidance application may determine, based on the comparing, that the keyword and the context correspond to at least one playback point in the media asset. For example, the media guidance application may search the data structure containing metadata related to playback points in the media asset for a playback point that is associated with both an identifier of the context and an identifier of the keyword. As a specific example, the media guidance application may determine that the keyword, "Tom Cruise" and the context "car chase" match values at a playback point of 55 minutes in the movie, "Edge of Tomorrow," based on comparison with metadata in the data structure associated with playback points in the media asset.

In some embodiments, the media guidance application may filter the playback points that are generated for display to only display those near the current playback point. For example, if there are a large number of playback points that include both the keyword and context, the media guidance application may not be able to adequately display indicators for all of them (e.g., in a display-constrained environment such as on a smart phone) and may select only some to present to the user. Specifically, the media guidance application may determine a number of the at least one playback point that correspond to the keyword and the context. For example, the media guidance application may initialize a counter while comparing the keyword and context with values in the data structure containing metadata related to playback points in the media asset, as described above. The media guidance application may increment the counter for each match that is determined and store the value as the number of matches. The media guidance application may compare the number to a threshold number. The threshold number may be any integer value, such as 5. The threshold number may be different for different devices based on the display size. For example, the threshold number for a television may be greater than a mobile phone, since the display size of the television is larger and more results can be displayed (e.g., on a progress bar) on the television without obscuring the media asset.

The media guidance application may determine that the number exceeds the threshold number. For example, the media guidance application may determine that the number exceeds the threshold number if 30 results were retrieved for a given keyword and context in a particular media asset and that the threshold number is ten. The media guidance application may, in response to determining that the number exceeds the threshold number, determine to generate for display a subset of the at least one playback point, wherein the subset includes only playback points within a threshold amount of time from the current playback point. For example, the media guidance application may determine to present fewer playback points by only presenting those within a certain time window of the current playback point. The media guidance application may determine the time window based on the threshold number. For example, if the threshold number is ten, then the media guidance application may select the ten closest playback points to the current playback point that matched the keyword and context to be generated for display. In some embodiments, the media guidance application may select playback points that are after the current playback point only. In other embodiments, the media guidance application may select playback points that are before and after the current playback point. In some embodiments, if the time window is predetermined (e.g., within 10 minutes of the playback point) and greater than the threshold number of results are still within the time window, then the media guidance application may select the threshold number of results to display and transmit the other results to a second-screen device, such as a user's mobile phone.

The media guidance application may generate for display an indication of the at least one playback point. The indication may be any text or graphic that is displayed that informs the user of the playback point(s) that match the context and keyword. For example, the media guidance application may generate indicators (e.g., tick marks) on a progress bar indicating the at least one playback point that matches both the keyword and the context, as described further below. As another example, the media guidance application may transmit identifiers of the playback point to a device that is not generating the media asset for display (e.g., the user is viewing a media asset on a television and the identifiers are transmitted to the user's mobile phone).

In some embodiments, the media guidance application may generate selectable indicators allowing the user to jump to playback points that match the context and keyword. Specifically, the media guidance application may receive a selection, by the user, of the indication. For example, the media guidance application may receive a selection of a particular indicator from a user via a user input interface, such as a remote control. As a specific example, the user may press the "OK" button while a particular playback point is highlighted. The media guidance application may then generate for display the media asset from the first playback point. For example, when the user selects a particular playback point, the media guidance application may play the media asset from that playback point. In this way, the media guidance application may allow a user to quickly navigate to scenes/playback points of interest.

In some embodiments, the media guidance application may generate for display a progress bar overlaid on the media asset. For example, the media guidance application may generate for display, either overlaid on the media asset or in a separate section of a display screen, a graphic of a bar that is filled in (e.g., in a particular color) up to a certain point indicating the current playback position. The progress bar may optionally include a numeric time indicator near the progress bar indicating the currently playback position (e.g., 00:30:30 in hours:minutes:seconds). The media guidance application may determine locations on the progress bar corresponding to each of the at least one playback point. For example, the media guidance application may determine positions on the progress bar where indicators should be placed to inform the user of playback positions that match the keyword and the context. As a specific example, the media guidance application may determine that the total length of the progress bar is ten pixels and that a particular playback point that matches the keyword and context occurs when the media asset is 30% over. Accordingly, the media guidance application may determine that the location to display an indicator for that playback point is at the third pixel of the ten pixel length progress bar. The media guidance application may generate for display, at each of the locations on the progress bar, the indication. For example, the media guidance application may generate for display tick marks at each location or any other visually distinguishable mark overlaid on the progress bar to inform the user of the playback points that match the keyword and the context.

In some embodiments, the media guidance application may transmit some or all of the playback points that match the keyword and context to a second device associated with the user. Specifically, the media guidance application may determine that a number of the at least one playback point that correspond to the keyword and the context exceed a threshold number to display on the first device. For example, as described above, the threshold number may be any integer value, such as 5. The threshold number may be different for different devices based on the display size. For example, the threshold number for a television may be greater than a mobile phone, since the display size of the television is larger and more results can be displayed (e.g., on a progress bar) on the television without obscuring the media asset. For example, the media guidance application may determine that the number exceeds the threshold number if 30 results were retrieved for a given keyword and context in a particular media asset and that the threshold number is ten for a particular device (e.g., a smart phone). The media guidance application, in response to determining that the number exceeds the threshold number to display on the first device, determines a second device associated with the user. For example, the media guidance application may access a user profile associated with the user in local storage or at a remote server. The media guidance application may retrieve an identifier (e.g., an IP address or phone number) of a device associated with the user from the user profile. The media guidance application may then transmit data associated with one or more of the at least one playback points to the second device to be displayed by the second device. For example, the media guidance application may transmit a data packet to the second device including identifiers of the playback points and instructions to generate the identifiers for display in a particular format (e.g., a table).

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described for determining playback points in media assets based on both a keyword and a context of a current playback point in a media asset. For example, while consuming a media asset, a user may input a keyword (e.g., the text "Tom Cruise"). In response to the user input of the keyword, a current playback point in the media asset is determined and context of the media asset at the current playback point are determined (e.g., the current playback point involves a car chase). Playback points are determined that match both the context and the keyword and presented to the user (e.g., playback points with Tom Cruise in a car chase).

Figure 1:
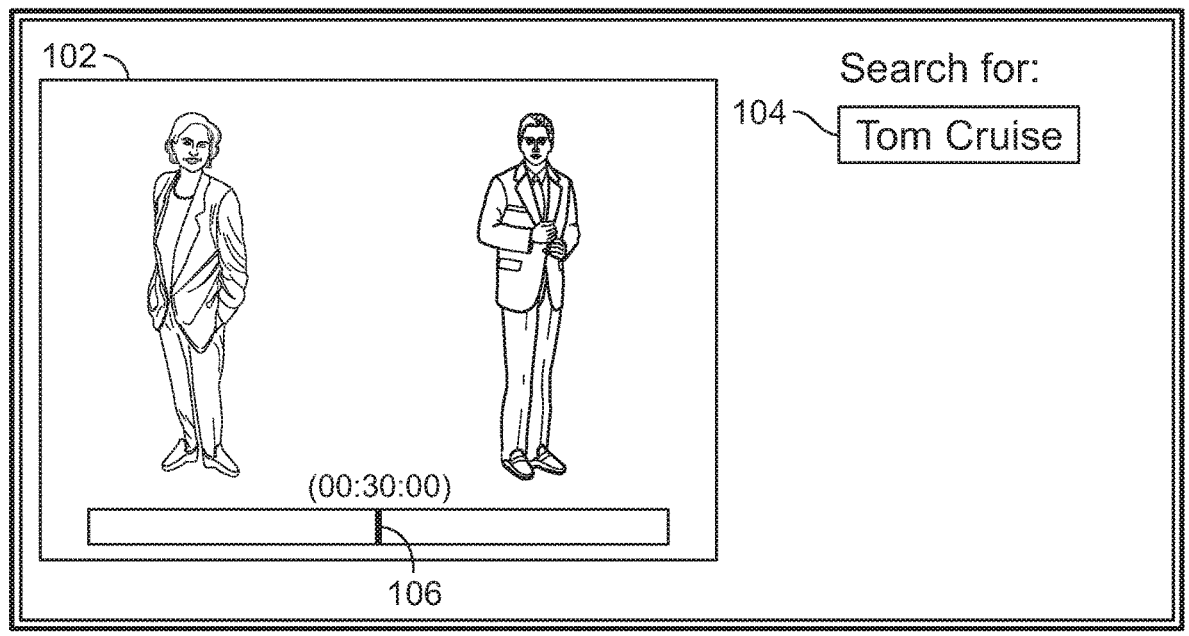
FIG. 1 shows an illustrative example of a display presenting a media asset to a user, in accordance with some embodiments of the disclosure.

FIG. 1 shows an illustrative example of a display presenting a media asset to a user, in accordance with some embodiments of the disclosure. For example, display 100 may be coupled to user equipment which executes a media guidance application in order to display media asset 102 to a user. Media asset 102 is at current playback point 106, which may be indicated on display 100 via an indicator on a progress bar. The media guidance application may receive keyword 104 via a user input interface coupled to the same user equipment displaying display 100 or other user equipment. Display 100 may appear on one or more user devices (e.g., any of the devices listed in FIGS. 7-8 below). Moreover, the media guidance application may use one or more of the processes described in FIGS. 9-13 to generate display 100 or any of the features described therein.

In some embodiments, a media guidance application may generate for display a media asset. For example, the media guidance application may generate for display media asset 102 on display 100. In some embodiments, the media guidance application may generate media asset 102 for display in response to receiving a user selection of media asset 102 (e.g., via a user input interface such as a touch screen).

The media guidance application may receive, while generating for display the media asset, a keyword from a user. For example, the media guidance application may receive text, graphics, or a combination that identify at least one characteristic of the media asset as the keyword (e.g., keyword 104). The characteristic may be any metadata relating to the media asset, such as a person associated with the media asset (e.g., actor, director, producer, etc.) and/or an identifier of the action (e.g., "car chase,"), and/or an identifier of a location (e.g., "Paris"). In some embodiments, the media guidance application may generate for display (e.g., on display 100) a field for text input of the keyword (e.g., keyword 104). For example, using a remote control, the user may input a string of characters (e.g., "Tom Cruise") which the media guidance application receives as the keyword (e.g., keyword 104).

The media guidance application, in response to receiving the keyword from the user may determine a context in the media asset being generated for display. Specifically, the media guidance application may determine a current playback point in the media asset. For example, the media guidance application may retrieve a time code (e.g., "00:30: 00:00", in the format hours:minutes:seconds:frames) corresponding to the current playback point (e.g., current playback point 106) in the media asset (e.g., 30 minutes into media asset 102). The media guidance application may retrieve the time code from a time code signal in the media asset (e.g., media asset 102) containing a set of binary coded decimal values referring to the present playback position in the media asset. For example, the media guidance application may determine that a particular signal or header in a data packet contains binary coded decimal values and retrieve those values. The media guidance application converts each binary coded decimal value to a corresponding decimal value corresponding to the time code. For example, the media guidance application may determine that four particular bits relating to one value in the time code are "1001" which may correspond to the value "9" in the time code.

The media guidance application may retrieve metadata associated with the current playback point. For example, the media guidance application may retrieve metadata associated with the current playback point (e.g., current playback point 106) from local storage or a remote server. The metadata may be organized in a table or other data structure. For example, the media guidance application may retrieve a data structure specific to the media asset (e.g., media asset 102) currently being generated for display. The metadata may be organized in a table, where each row of the table relates to a particular playback point or range of playback points and each field in the row contains a particular value (e.g., a string of characters). The values may be any character or string of characters that describe the current playback point (e.g., current playback point 106) in the media asset (e.g., media asset 102). For example, the metadata may be a song currently playing in the media asset (e.g., media asset 102), a location of a scene in the media asset (e.g., media asset 102), a general description of the current action (e.g., "car chase"), or an actor appearing at that time in the media asset (e.g., media asset 102). The media guidance application may compare the value for the current playback point (e.g., current playback point 106) with values in the data structure storing metadata associated with playback points in the media asset (e.g., media asset 102). The media guidance application may determine, based on the comparison, a particular field or fields of metadata that relate to the media asset (e.g., media asset 102) at the current playback point (e.g., current playback point 106). For example, the media guidance application may determine that the current playback point (e.g., current playback point 106) of 30 minutes into the movie, "Edge of Tomorrow" (e.g., media asset 102) matches a stored playback point in the data structure and may retrieve the string, "Tom Cruise" from an associated field.

The media guidance application may assign a context based on the retrieved metadata associated with the current playback point. For example, the media guidance application may use the metadata at the current playback point to assign context to the keyword (e.g., keyword 104) that the user has searched for. Specifically, the media guidance application may use the context as a filtering criterion to lower the number of results returned for the keyword (e.g., keyword 104) and thus provide the user with more meaningful results. In some embodiments, multiple metadata values may be returned for a given playback point (e.g., current playback point 106). The media guidance application may, in this situation, use some, all, or only a single one as the filtering criteria. The media guidance application may choose which context to assign based on a user profile (e.g., the user likes Tom Cruise, so it is assigned as the context) and/or the number of results returned (e.g., if one context would lead to zero results when combined with the keyword, another context may be assigned).

In some embodiments, the media guidance application may receive multiple keywords that the user desires to search for, which may also be used to determine the context. Specifically, the media guidance application may receive, while generating for display the media asset, a second keyword from the user. For example, the media guidance application may receive a user input of "Tom Cruise" (e.g., keyword 104) and a user input of "Nicole Kidman," two actors in a particular movie (e.g., media asset 102) being generated for display. The media guidance application may determine, based on characteristics of the first keyword and characteristics of the second keyword, a keyword context linking the first keyword with the second keyword. For example, the media guidance application may access a database either in local storage or at a remote server that includes pairs of keywords (e.g., keyword 104 and another keyword) and a string of characters that links the two keywords. For example, the media guidance application may determine that the database includes an entry, which may be specific to the media asset, that "Tom Cruise" and "Nichole Kidman" are "romantic interests." The media guidance application may assign a default linking context or no linking context if one does not exist for two keywords in the database. The media guidance application may assign the context based on both (1) the keyword context and (2) the retrieved metadata associated with the current playback point (e.g., current playback point 106). For example, the media guidance application may determine that there are multiple contexts from the retrieved metadata that is associated with the current playback point (e.g., current playback point 106). By using the keyword context, the media guidance application may be able to select the context desired by the user and search for playback points that correspond to the desired context. As a specific example, if the media guidance application determines that, from the retrieved metadata, the context could be "romantic" or "travel," and that the keyword context is "romantic interests," then the media guidance application may determine the context should be "romantic" since it applies to both the keyword context and the retrieved metadata associated with the playback point (e.g., current playback point 106). The media guidance application may determine whether the keyword context matches retrieved metadata based on comparing characters of the keyword context with characters of the retrieved metadata.

In some embodiments, the media guidance application may assign the context based on user preferences. Specifically, the media guidance application may determine, based on the retrieved metadata, that a plurality of contexts correspond to the current playback point (e.g., current playback point 106). For example, the media guidance application may determine that there are multiple contexts from the retrieved metadata that is associated with the current playback point (e.g., current playback point 106). As a specific example, the media guidance application may search a database for contexts associated with the movie, "Edge of Tomorrow" (e.g., media asset 102) at a playback point of 30 minutes (e.g., current playback point 106) and retrieve strings of characters, "action" and "gun-fight," corresponding to two contexts at that playback point. The media guidance application may retrieve, from a user profile, a context preference. For example, the media guidance application may access a user profile stored in local storage or at a remote server containing user preferences for particular types of content. As one specific example, the media guidance application may search a viewing history in the user profile and determine that a threshold amount of media assets consumed by the user include a particular context (e.g., "gun-fight") and may determine that the user has a preference for the context. As another example, the media guidance application may determine that there is an explicit preference for a particular context (e.g., stored in a favorites list) stored in the user profile, such as an indication that the user enjoys "car chases."

The media guidance application may determine that the context preference matches a first context of the plurality of contexts. For example, the media guidance application may retrieve one or more context preferences of the user from the user profile and compare characters of each context from the user profile to characters of each of the multiple context preferences for the current playback point (e.g., current playback point 106). The media guidance application may determine a match based on a threshold percentage (e.g., 90%) of the characters matching between two contexts. The media guidance application may then assign the first context as the context. For example, upon determining that the user has a preference (e.g., based on the user profile) for "gun-fights" and one of the contexts at the current playback point (e.g., current playback point 106) is a "gun-fight" the media guidance application may assign "gun-fight" as the context for search purposes. In some embodiments, multiple contexts may match between the user preferred contexts from the user profile and the current playback point (e.g., current playback point 106). In this situation, the media guidance application may rank the contexts according to an algorithm to determine which context to assign. For example, the media guidance application may determine that the user has viewed a threshold number of media assets that include "gun-fights" and "magic tricks," which both match a context associated with a current playback point, but that the user has consumed more media assets with "gun-fights" than "magic tricks" and thus assigns "gun-fights" as the context. Alternatively or additionally, the media guidance application may generate a ranking of contexts based on additional factors, such as the popularity of a context described below, when determining which context to assign.

In some embodiments, the media guidance application may assign the context based on the popularity of particular contexts. Specifically, the media guidance application may determine, based on the retrieved metadata, that a plurality of contexts correspond to the current playback point (e.g., current playback point 106). For example, the media guidance application may determine that there are multiple contexts from the retrieved metadata that is associated with the current playback point (e.g., current playback point 106). As a specific example, the media guidance application may search a database for contexts associated with the movie, "Edge of Tomorrow" (e.g., media asset 102) at a playback point of 30 minutes (e.g., current playback point 106) and retrieve strings of characters, "action" and "gun-fight," corresponding to two contexts at that playback point. The media guidance application may retrieve, from a server, an indication of popularity for each of the plurality of contexts. For example, the media guidance application may access a server that includes a data structure of strings corresponding to contexts that are each associated with a popularity value. The media guidance application may compare characters of each of the plurality of contexts with characters of strings corresponding to contexts in the data structure. Upon determining a match, the media guidance application may retrieve, from an associated field, a popularity value. The popularity value may be a ranking (e.g., $3^{rd}$ most popular based on searches in the past month), number (e.g., the number of times the particular context has been searched/requested over a period of time), or any other numeric value that allows two contexts to be differentiated as more or less popular.

The media guidance application may determine, based on the retrieved indication of popularity for each of the plurality of contexts, a most popular context. For example, the media guidance application may compare the retrieved values and determine which value indicates a more popular context. As a specific example, the media guidance application may determine that "gun-fight" has been searched for the $4^{th}$ most by users and "car chase" has been search for the $10^{th}$ most by users over a predetermined period of time and thus determine "gun-fight" is more popular. The media guidance application may assign the most popular context as the context. For example, upon determining that "gun-fight" is the most popular context that is associated with the current playback point, the media guidance application may assign "gun-fight" as the context for search purposes.

The media guidance application may compare both (1) the keyword and (2) the context with a plurality of keywords and contexts associated with playback points in the media asset. For example, the media guidance application may search the data structure containing metadata related to playback points in the media asset (e.g., media asset 102) for a playback point that is associated with both an identifier of the context and an identifier of the keyword (e.g., keyword 104). The media guidance application may compare characters of the context and keyword (e.g., keyword 104) with characters of contexts and keywords stored in fields of the data structure. If both the context and keyword (e.g., keyword 104) match values stored in fields for the same playback point, the media guidance application may determine that the playback point is a match.

The media guidance application may determine, based on the comparing, that the keyword and the context correspond to at least one playback point in the media asset. For example, the media guidance application may search the data structure containing metadata related to playback points in the media asset (e.g., media asset 102) for a playback point that is associated with both an identifier of the context and an identifier of the keyword (e.g., keyword 104). As a specific example, the media guidance application may determine that the keyword, "Tom Cruise" (e.g., keyword 104) and the context "car chase" match values at a playback point of 55 minutes in the movie, "Edge of Tomorrow," based on comparison with metadata in the data structure associated with playback points in the media asset (e.g., media asset 102).

In some embodiments, the media guidance application filter the playback points that are generated for display to only display those near the current playback point. For example, if there are a large number of playback points that include both the keyword (e.g., keyword 104) and context (e.g., based on metadata relating to current playback point 106), the media guidance application may not be able to adequately display indicators for all of the playback points (e.g., in a display-constrained environment such as on a smart phone) and may select only some to present to the user. Specifically, the media guidance application may determine a number of the at least one playback point that correspond to the keyword (e.g., keyword 104) and the context. For example, the media guidance application may initialize a counter while comparing the keyword (e.g., keyword 104) and context with values in the data structure containing metadata related to playback points in the media asset (e.g., media asset 102), as described above. The media guidance application may increment the counter for each match that is determined and store the value as the number of matches. The media guidance application may compare the number to a threshold number. The threshold number may be any integer value, such as 5. The threshold number may be different for different devices based on the display size. For example, the threshold number for a television may be greater than a mobile phone, since the display size of the television is larger and more results can be displayed (e.g., on a progress bar) on the television without obscuring the media asset (e.g., media asset 102).

The media guidance application may determine that the number exceeds the threshold number. For example, the media guidance application may determine that the number exceeds the threshold number if 30 results were retrieved for a given keyword (e.g., keyword 1040 and context in a particular media asset (e.g., media asset 102) and that the threshold number is ten. The media guidance application may, in response to determining that the number exceeds the threshold number, determine to generate for display a subset of the at least one playback point, wherein the subset includes only playback points within a threshold amount of time from the current playback point (e.g., current playback point 106). For example, the media guidance application may determine to present fewer playback points by only presenting those within a certain time window of the current playback point (e.g., current playback point 106). The media guidance application may determine the time window based on the threshold number. For example, if the threshold number is ten, then the media guidance application may select the ten closest playback points to the current playback point that matched the keyword (e.g., keyword 104) and context to be generated for display. In some embodiments, the media guidance application may select playback points that are after the current playback point (e.g., current playback point 106) only. In other embodiments, the media guidance application may select playback points that are before and after the current playback point (e.g., current playback point 106). In some embodiments, if the time window is predetermined (e.g., within 10 minutes of the playback point) and greater than the threshold number of results are still within the time window, then the media guidance application may select the threshold number of results to display and transmit the other results to a second-screen device, such as a user's mobile phone.

Figure 2:
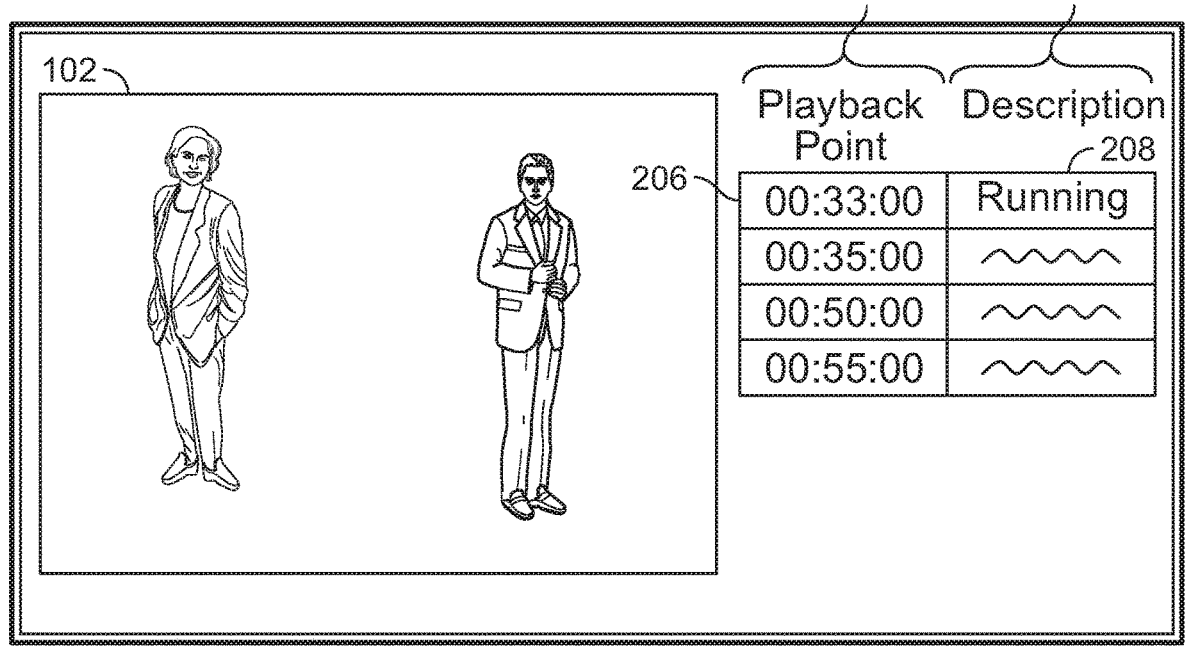
FIG. 2 shows an illustrative example of a display presenting playback points in a media asset that correspond to a keyword and a context, in accordance with some embodiments of the disclosure.

FIG. 2 shows an illustrative example of a display presenting playback points in a media asset that correspond to a keyword and a context, in accordance with some embodiments of the disclosure. For example, display 200 may be coupled to user equipment which executes a media guidance application in order to display media asset 102 to a user. After receiving a keyword (e.g., keyword 104) and determining a context, as described with respect to FIG. 1, display 200 may include playback points 202 displayed in a grid that match both the keyword and the context. Display 200 may additionally include descriptions 204 providing additional information on each of playback points 202. For example, playback point 206 is associated with description 208. Display 200 may appear on one or more user devices (e.g., any of the devices listed in FIGS. 7-8 below). Moreover, the media guidance application may use one or more of the processes described in FIGS. 9-13 to generate display 200 or any of the features described therein.

The media guidance application may generate for display an indication of the at least one playback point. The indication (e.g., of playback points 202) may be any text or graphic that is displayed that informs the user of the playback point(s) that match the context and keyword. For example, the media guidance application may generate cells organized in a grid, where each cell includes a playback point (e.g., one of playback points 202). As another example, the media guidance application may transmit identifiers of the playback point (e.g., playback points 202) to a device that is not generating the media asset (e.g., media asset 102) for display (e.g., the user is viewing a media asset on a television and the identifiers are transmitted to the user's mobile phone).

In some embodiments, the media guidance application may generate selectable indicators allowing the user to jump to playback points that match the context and keyword. Specifically, the media guidance application may receive a selection, by the user, of the indication. For example, the media guidance application may receive a selection of a particular indicator (e.g., of a cell containing playback point 206) from a user via a user input interface, such as a remote control. As a specific example, the user may press the "OK" button while a particular playback point (e.g., playback point 206) is highlighted. The media guidance application may then generate for display the media asset (e.g., media asset 102) from the playback point associated with the indicator (e.g., playback point 206). For example, when the user selects a particular playback point (e.g., playback point 206), the media guidance application may play back the media asset (e.g., media asset 102) from the playback point. In this way, the media guidance application may allow a user to quickly navigate to scenes/playback points of interest.

In some embodiments, the media guidance application may transmit some or all of the playback points (e.g., playback points 202) that match the keyword and context to a second device associated with the user. Specifically, the media guidance application may determine that a number of the at least one playback point (e.g., playback points 202) that correspond to the keyword and the context exceed a threshold number to display on the first device (e.g., on display 200). For example, as described above, the threshold number may be any integer value, such as 5. The threshold number may be different for different devices based on the display size. For example, the threshold number for a television may be greater than a mobile phone, since the display size of the television is larger and more results can be displayed (e.g., on a progress bar) on the television without obscuring the media asset. For example, the media guidance application may determine that the number exceeds the threshold number if 30 results were determined for a given keyword and context in a particular media asset (e.g., media asset 102) and that the threshold number is ten for a particular device (e.g., a smart phone). The media guidance application, in response to determining that the number exceeds the threshold number to display on the first device, determines a second device associated with the user. For example, the media guidance application may access a user profile associated with the user in local storage or at a remote server. The media guidance application may retrieve an identifier (e.g., an IP address or phone number) of a device associated with the user from the user profile. The media guidance application may then transmit data associated with one or more of the at least one playback points (e.g., playback points 202) to the second device to be displayed by the second device. For example, the media guidance application may transmit a data packet to the second device including identifiers of the playback points (e.g., playback points 202) and instructions to generate the identifiers for display in a particular format (e.g., a table).

Figure 3:
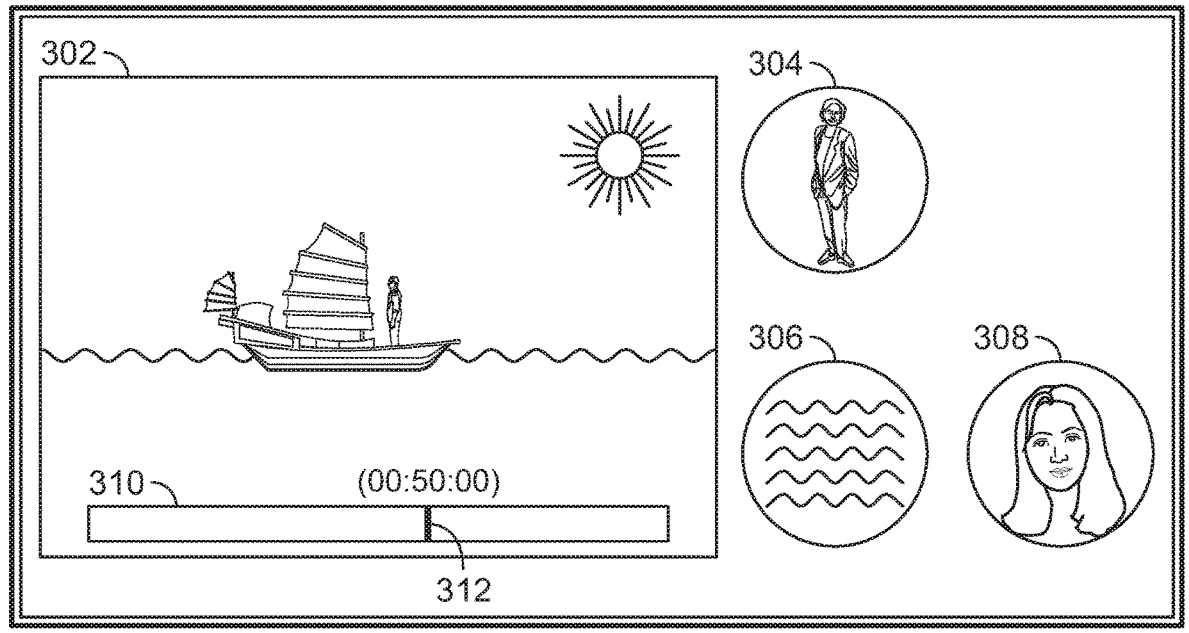
FIG. 3 shows another illustrative example of a display presenting a media asset to a user, in accordance with some embodiments of the disclosure.

FIG. 3 shows another illustrative example of a display presenting a media asset to a user, in accordance with some embodiments of the disclosure. For example, display 300 may be coupled to user equipment which executes a media guidance application in order to display media asset 302 to a user. Media asset 302 is at current playback point 312, which may be indicated on display 100 via an indicator on progress bar 310. Display 300 may include indicators 304, 306, and 308. Indicators 304, 306, and 310 may be selectable by the user using a user input interface (e.g., a touch screen). Upon selection of one or more of indicators 304, 306, and/or 308, the media guidance application may determine an attribute associated with the one or more selected indicators is a keyword for a search in media asset 302, similar to as discussed above with respect to FIG. 1. Display 300 may appear on one or more user devices (e.g., any of the devices listed in FIGS. 7-8 below). Moreover, the media guidance application may use one or more of the processes described in FIGS. 9-13 to generate display 300 or any of the features described therein.

In some embodiments, the media guidance application may generate for display suggested and/or popular search terms (e.g., indicators 304, 306, and 308) in response to a user request to perform a search while consuming the media asset (e.g., media asset 302). For example, the user may select a "search" button on a remote control and indicators containing graphics (e.g., indicator 304 may include a picture of an actor) and/or text for keywords may be generated for display by the media guidance application. The media guidance application may receive a user selection of one of the indicators (e.g., indicator 308) and determine the keyword based on the selection (e.g., an actress associated with a graphic of indicator 308).

In some embodiments, the indicators are generated either as an overlay of the media asset or in a separate section of the display from the media asset. For example, the media guidance application may generate indicators (e.g., indicators 304, 306, and 308) of keywords for the user to select on the right side of a display screen (e.g., display 300) and the media asset (e.g., media asset 302) on the left side. Alternatively or additionally, the media guidance application may overlay the keywords on the media asset. The media guidance application may generate for display translucent indicators (e.g., indicators 304, 306, and 308) to allow a user to view the media asset (e.g., media asset 302). In some embodiments, the media guidance application may dynamically update the indicators (e.g., indicators 304, 306, and 308) based on the current playback point (e.g., current playback point 312) in the media asset (e.g., media asset 302). For example, in scenes with Tom Cruise, different keywords may be more commonly selected than scenes with Emily Blunt so some or all of the indicators (e.g., some or all of indicators 304, 306, and 308) may be swapped depending on which actor is in the media asset (e.g., media asset 302) at the current playback point (e.g., current playback point 312).

In some embodiments, the media guidance application may generate for display a plurality of indicators (e.g., indicators 304, 306, and 308) for attributes of the media asset. For example, the media guidance application may generate a series of graphics (e.g., indicators 304, 306, and 308) associated with attributes of the media asset (e.g., media asset 302). As a specific example, one graphic may include a headshot of the actor Emily Blunt and another graphic may include a picture of the Eiffel Tower (e.g., representing Paris) as both Emily Blunt and Paris are attributes of the media asset (e.g., media asset 302) currently being generated for display. The media guidance application may generate uniformly shaped indicators (e.g., circles of the same size) or vary the shapes and sizes of the indicators based on the properties of the graphics. For example, in order to avoid distortion, the media guidance application may generate graphics in the same aspect ratio as their source files. Alternatively or additionally, the media guidance application may generate indicators of different sizes based on the popularity of the associated attribute. For example, the media guidance application may access a database and determine that users have searched for Tom Cruise one million more times than Emily Blunt. The media guidance application may accordingly generate for display a larger indicator with a headshot of Tom Cruise than one of Emily Blunt.

The media guidance application may receive a user input from the user selecting a first indicator associated with a first attribute. For example, the media guidance application may receive a user input (e.g., via a user input interface such as a touch screen on a tablet) of a particular indicator (e.g., indicator 308). As a specific example, the media guidance application may receive a user input selecting a graphic (e.g., indicator 308) with a headshot of an actress. The media guidance application may, in response to receiving the user input selecting the first indicator, determine that the first attribute is the keyword. For example, upon determining that the user has selected an indicator (e.g., indicator 308) with a headshot of Emily Blunt, the media guidance application may determine that "Emily Blunt," the attribute associated with the indicator (e.g., indicator 308), is the keyword that the user desires to search for.

In some embodiments, the media guidance application may generate indicators (e.g., indicators 304, 306, and 308) for categories of attributes associated with the media asset. After receiving a selection of a category of attributes, the media guidance application may generate indicators associated with the category, which may allow for more efficient use of display space in display constrained environments. Specifically, the media guidance application may, in response to receiving the keyword from the user, compare attributes of the keyword with attributes of each of a plurality of keywords related to the media asset (e.g., media asset 302). For example, the media guidance application may generate for display indicators for general categories of attributes associated with the media asset, such as "actors," "locations," and/or "scene type." The general category indicators may be for any keyword that has associated sub-keywords associated with the media asset. For example, "Tom Cruise" may be associated with "Tom Cruise running," "Tom Cruise fighting," "Tom Cruise sleeping," etc. and thus constitutes a general category. The media guidance application may determine to generate indicators (e.g., indicators 304, 306, and 308) for categories if there is a large number of attributes that could not fit on the display without obscuring the media asset. Upon receiving a selection from the user of a particular keyword (e.g., such as the category actor), the media guidance application may compare each attribute associated with the media asset to the selected keyword. For example, upon selection of an indicator that corresponds to an "actor" category, the media guidance application may, via character comparison with attributes of the media asset, determine which attributes are actors. The media guidance application may determine a subset of the plurality of keywords that have an attribute that matches an attribute of the keyword. For example, the media guidance application may determine that there are five actors associated with the media asset "Edge of Tomorrow." Specifically, the media guidance application may determine the subset based on retrieving attributes, either locally or from a remote server, and comparing metadata associated with the attributes with the keyword.

The media guidance application may generate for display the subset of the plurality of keywords. As one example, the media guidance application may generate indicators overlaid or in a separate section of the same display on which the media asset (e.g., media asset 302) is also being generated for displayed. After receiving the selection of the keyword and determining the subset of related keywords, the media guidance application may generate for display new indicators (e.g., replacing indicators 304, 306, and 308) with the subset of the plurality of keywords instead of the keywords (e.g., for the categories) that were initially generated. As a specific example, indicators for "actor" and "location" may be replaced by specific actors (e.g., Tom Cruise and Emily Blunt) after a selection of "actor." Alternatively or additionally, the selected indicator may continue to be generated for display and the subset of the plurality of keywords may be generated for display radially around the selected keyword. In this example, the media guidance application may cease generating for display unselected keywords. Upon receiving a selection of one of the plurality of keywords, the media guidance application may determine the keyword that the user desires to search for in the media asset (e.g., media asset 302). In this way, the media guidance application may provide the user with more specific keywords via categories to better target specific playback points the user is interested in, while also conserving display space.

In some embodiments, the media guidance application may receive a selection of a keyword based on the user dragging one or more indicators (e.g., via a touchscreen device) and releasing the indicator(s) (e.g., one or more of indicators 304, 306, and 308) on the media asset (e.g., media asset 302) that is currently being generated for display. Specifically, the media guidance application may receive a user input selecting a first indicator of a plurality of indicators. For example, the media guidance application may receive a user selection of a graphical indicator (e.g., indicator 308) associated with a keyword (e.g., "Emily Blunt"). The media guidance application may then determine that, based on the user input, the user has dragged the graphical indicator over a specific portion of the media asset currently being generated for display. For example, the media guidance application may retrieve, from a database, an indication that objects are in certain portions of the media asset (e.g., media asset 302) at specific times (e.g., a range of time codes). As a specific example, the media guidance application may retrieve an indication that at a current playback point (e.g., current playback point 312), the object "boat" is in the center of the screen (e.g., defined by a box of pixel coordinates) and that the sun is in the top right corner of the screen. The media guidance application may determine that the user has dragged the graphical indicator (e.g., corresponding to the keyword) to one of the regions of the media asset corresponding to an object based on the pixel coordinates of the objects retrieved from the database. For example, the media guidance application may determine that the user dragged a graphical indicator (e.g., indicator 308) for "Emily Blunt" over the "boat" object in a media asset (e.g., media asset 302) currently being generated for display. In response to determining that the user has dragged the graphical indicator to a region of the media asset with an object, the media guidance application may assign the context based on the object. Continuing with the previous example, the media guidance application may assign "boat" or any attribute relating to the object "boat," as the context for search purposes with the keyword "Emily Blunt."

Figure 4:
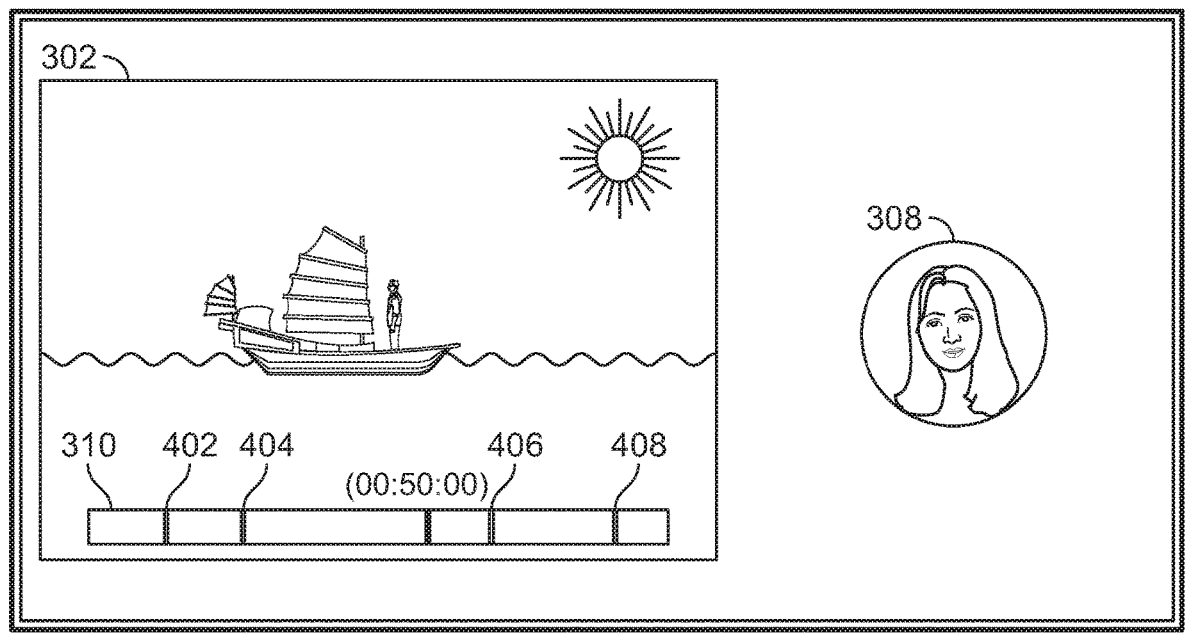
FIG. 4 shows another illustrative example of a display presenting playback points in a media asset that correspond to a keyword and a context, in accordance with some embodiments of the disclosure.

FIG. 4 shows another illustrative example of a display presenting playback points in a media asset that correspond to a keyword and a context, in accordance with some embodiments of the disclosure. For example, display 400 may be coupled to user equipment which executes a media guidance application in order to display media asset 302 to a user. After receiving a keyword (e.g., a selection of indicator 308 by the user) and determining a context, as described with respect to FIG. 1, display 300 may include playback points 402, 404, 406, and 408 overlaid on progress bar 310. Display 400 may appear on one or more user devices (e.g., any of the devices listed in FIGS. 7-8 below). Moreover, the media guidance application may use one or more of the processes described in FIGS. 9-13 to generate display 400 or any of the features described therein.

In some embodiments, the media guidance application may generate for display an indication of the at least one playback point. The indication (e.g., of playback points 402, 404, 406, and 408) may be any text or graphic that is displayed that informs the user of the playback point(s) that match the context and keyword. For example, the media guidance application may generate indicators (e.g., tick marks) on a progress bar (e.g., overlaid on progress bar 310) indicating the at least one playback point (e.g., playback point 402) that matches both the keyword and the context, as described further below.

In some embodiments, the media guidance application may generate for display a progress bar (e.g., progress bar 310) overlaid on the media asset. For example, the media guidance application may generate for display, either overlaid on the media asset or in a separate section of a display screen, a graphic of a bar that is filled in (e.g., in a particular color) up to a certain point indicating the current playback position. The progress bar (e.g., progress bar 310) may optionally include a numeric time indicator near the progress bar indicating the currently playback position (e.g., 00:30:30 in hours:minutes:seconds). The media guidance application may determine locations on the progress bar (e.g., progress bar 310) corresponding to each of the at least one playback point (e.g., each of playback points 402, 404, 406, and 408). For example, the media guidance application may determine positions on the progress bar (e.g., progress bar 310) where indicators should be placed to inform the user of playback positions that match the keyword and the context. As a specific example, the media guidance application may determine that the total length of the progress bar (e.g., progress bar 310) is ten pixels and that a particular playback point (e.g., playback point 404) that matches the keyword and context occurs when the media asset (e.g., media asset 302) is 30% over. Accordingly, the media guidance application may determine that the location to display an indicator for that playback point (e.g., playback point 404) is at the third pixel of the ten pixel length progress bar. The media guidance application may generate for display, at each of the locations on the progress bar, the indication. For example, the media guidance application may generate for display vertical tick marks of a given thickness at each location or any other visually distinguishable mark overlaid on the progress bar to inform the user of the playback points that match the keyword and the context.

In some embodiments, the media guidance application may perform a search using both context and keywords(s) without consuming a media asset. For example, due to the small display size of some touch screen devices, it may be desirable to allow for filtering and/or searching through large numbers of results even when not consuming a media asset. As a specific example, the media guidance application may generate for display indicators and allow a user to filter the results by dragging the indicators to different locations on the screen. Specifically, the media guidance application may generate indicators based on a user search for a keyword, or may generate default indicators associated with an application the user is currently using. For example, the user may input (e.g., via a user input interface such as a touch screen) the search term "Tom Cruise" and the media guidance application may generate for display indicators (e.g., graphics and/or text) with results associated with "Tom Cruise." Alternatively or additionally, the media guidance application may automatically choose indicators to generate for display based on an application and/or use of the device. For example, the media guidance application may generate for display graphics for a plurality of different actors when the user opens a movies application on the device.

The media guidance application may then receive a user selection of one or more of the indicators and execute an appropriate action. For example, the media guidance application may receive a user selection of one indicator and may generate for display information associated with the indicator. As a specific example, if a user selects an indicator associated with the "Mission Impossible" movies, the media guidance application may generate for display indicators for each of the movies, review summaries for the movies, actors in the movies, or any other information related to "Mission Impossible." As another example, the media guidance application may receive a user selection of multiple indicators, which the media guidance application may interpret as a request to refine the indicators displayed to include results related to attributes associated with the selected indicators. For example, if the media guidance application receives a user selection of indicators associated with "car chases" and "Mission Impossible," then the media guidance application may generate for display new indicators related to car chases in the Mission Impossible movies.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 5:
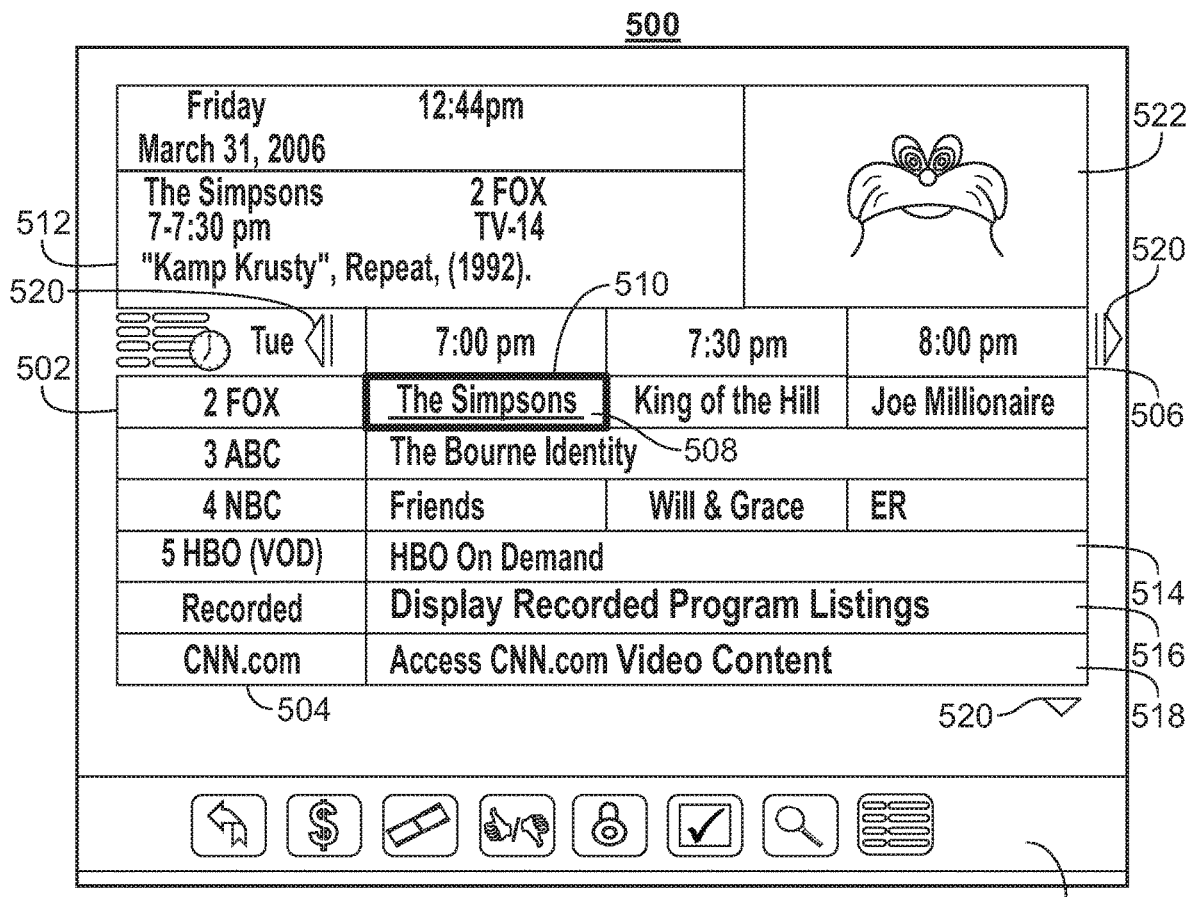
FIG. 5 shows an illustrative example of a display screen for use in accessing media content in accordance with some embodiments of the disclosure.
Figure 6:
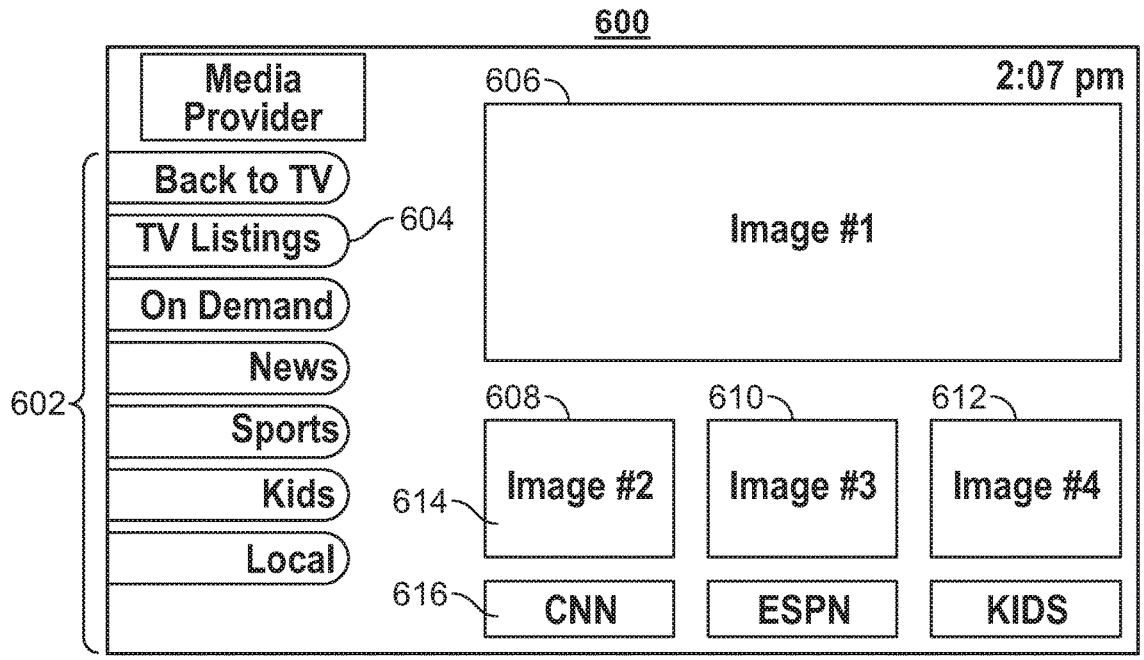
FIG. 6 shows another illustrative example of a display screen for use in accessing media content in accordance with some embodiments of the disclosure.

FIGS. 5-6 show illustrative display screens that may be used to provide media guidance data. The display screens shown in FIGS. 5-6 may be implemented on any suitable user equipment device or platform. While the displays of FIGS. 5-6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 5 shows illustrative grid of a program listings display 500 arranged by time and channel that also enables access to different types of content in a single display. Display 500 may include grid 502 with: (1) a column of channel/content type identifiers 504, where each channel/content type identifier (which is a cell in the column) identifies a different channel or content type available; and (2) a row of time identifiers 506, where each time identifier (which is a cell in the row) identifies a time block of programming. Grid 502 also includes cells of program listings, such as program listing 508, where each listing provides the title of the program provided on the listing's associated channel and time. With a user input device, a user can select program listings by moving highlight region 510. Information relating to the program listing selected by highlight region 510 may be provided in program information region 512. Region 512 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 502 may provide media guidance data for non-linear programming including on-demand listing 514, recorded content listing 516, and Internet content listing 518. A display combining media guidance data for content from different types of content sources is sometimes referred to as a "mixed-media" display. Various permutations of the types of media guidance data that may be displayed that are different than display 500 may be based on user selection or guidance application definition (e.g., a display of only recorded and broadcast listings, only on-demand and broadcast listings, etc.). As illustrated, listings 514, 516, and 518 are shown as spanning the entire time block displayed in grid 502 to indicate that selection of these listings may provide access to a display dedicated to on-demand listings, recorded listings, or Internet listings, respectively. In some embodiments, listings for these content types may be included directly in grid 502. Additional media guidance data may be displayed in response to the user selecting one of the navigational icons 520. (Pressing an arrow key on a user input device may affect the display in a similar manner as selecting navigational icons 520.)

Display 500 may also include video region 522, and options region 526. Video region 522 may allow the user to view and/or preview programs that are currently available, will be available, or were available to the user. The content of video region 522 may correspond to, or be independent from, one of the listings displayed in grid 502. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 526 may allow the user to access different types of content, media guidance application displays, and/or media guidance application features. Options region 526 may be part of display 500 (and other display screens described herein), or may be invoked by a user by selecting an on-screen option or pressing a dedicated or assignable button on a user input device. The selectable options within options region 526 may concern features related to program listings in grid 502 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 8. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 6. Video mosaic display 600 includes selectable options 602 for content information organized based on content type, genre, and/or other organization criteria. In display 600, television listings option 604 is selected, thus providing listings 606, 608, 610, and 612 as broadcast program listings. In display 600 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 608 may include more than one portion, including media portion 614 and text portion 616. Media portion 614 and/or text portion 616 may be selectable to view content in full-screen or to view information related to the content displayed in media portion 614 (e.g., to view listings for the channel that the video is displayed on).

The listings in display 600 are of different sizes (i.e., listing 606 is larger than listings 608, 610, and 612), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 7:
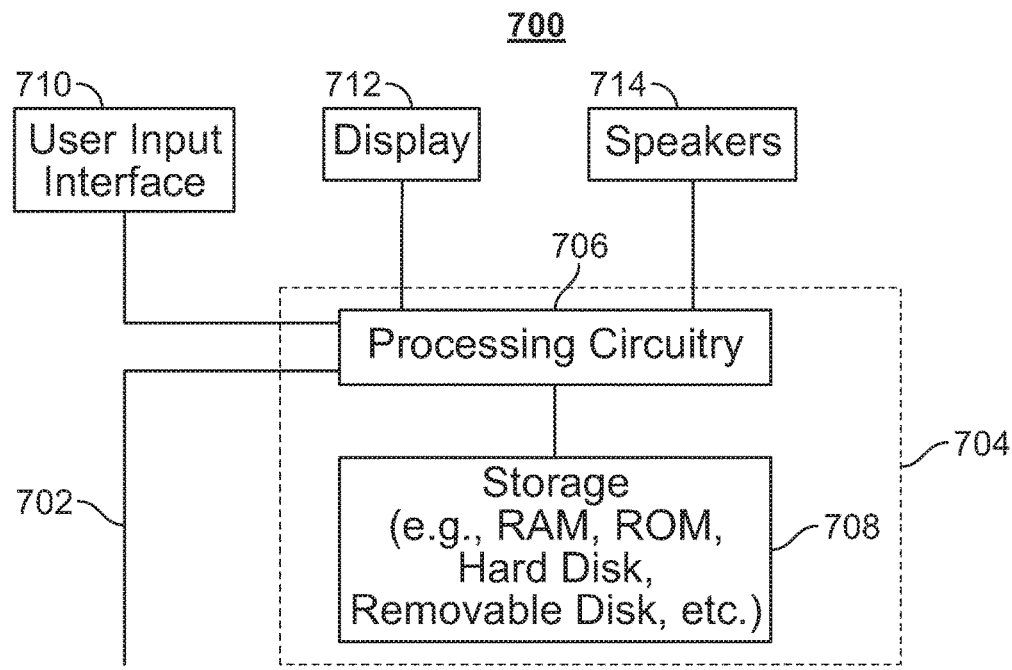
FIG. 7 is a block diagram of an illustrative user equipment device in accordance with some embodiments of the disclosure.

Users may access content and the media guidance application (and its display screens described above and below) from one or more of their user equipment devices. FIG. 7 shows a generalized embodiment of illustrative user equipment device 700. More specific implementations of user equipment devices are discussed below in connection with FIG. 8. User equipment device 700 may receive content and data via input/output (hereinafter "I/O") path 702. I/O path 702 may provide content (e.g., broadcast programming, on-demand programming, Internet content, content available over a local area network (LAN) or wide area network (WAN), and/or other content) and data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for a media guidance application stored in memory (i.e., storage 708). Specifically, control circuitry 704 may be instructed by the media guidance application to perform the functions discussed above and below. For example, the media guidance application may provide instructions to control circuitry 704 to generate the media guidance displays. In some implementations, any action performed by control circuitry 704 may be based on instructions received from the media guidance application.

In client-server based embodiments, control circuitry 704 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as media guidance data described above. Nonvolatile memory may also be used (e.g., to launch a boot-up routine and other instructions). Cloud-based storage, described in relation to FIG. 8, may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of the user equipment 700. Circuitry 704 may also include digital-to-analog converter circuitry and analog-to-digital converter circuitry for converting between digital and analog signals. The tuning and encoding circuitry may be used by the user equipment device to receive and to display, to play, or to record content.

The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment 700, the tuning and encoding circuitry (including multiple tuners) may be associated with storage 708.

A user may send instructions to control circuitry 704 using user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of user equipment device 700. For example, display 712 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 712 may be HDTV-capable. In some embodiments, display 712 may be a 3D display, and the interactive media guidance application and any suitable content may be displayed in 3D. A video card or graphics card may generate the output to the display 712. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 704. The video card may be integrated with the control circuitry 704. Speakers 714 may be provided as integrated with other elements of user equipment device 700 or may be stand-alone units. The audio component of videos and other content displayed on display 712 may be played through speakers 714. In some embodiments, the audio may be distributed to a receiver (not shown), which processes and outputs the audio via speakers 714.

The guidance application may be implemented using any suitable architecture. For example, it may be a stand-alone application wholly-implemented on user equipment device 700. In such an approach, instructions of the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to generate any of the displays discussed herein. Based on the processed instructions, control circuitry 704 may determine what action to perform when input is received from input interface 710. For example, movement of a cursor on a display up/down may be indicated by the processed instructions when input interface 710 indicates that an up/down button was selected.

In some embodiments, the media guidance application is a client-server based application. Data for use by a thick or thin client implemented on user equipment device 700 is retrieved on-demand by issuing requests to a server remote to the user equipment device 700. In one example of a client-server based guidance application, control circuitry 704 runs a web browser that interprets web pages provided by a remote server. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on equipment device 700. This way, the processing of the instructions is performed remotely by the server while the resulting displays are provided locally on equipment device 700. Equipment device 700 may receive inputs from the user via input interface 710 and transmit those inputs to the remote server for processing and generating the corresponding displays. For example, equipment device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to equipment device 700 for presentation to the user.

In some embodiments, the media guidance application is downloaded and interpreted or otherwise run by an interpreter or virtual machine (run by control circuitry 704). In some embodiments, the guidance application may be encoded in the ETV Binary Interchange Format (EBIF), received by control circuitry 704 as part of a suitable feed, and interpreted by a user agent running on control circuitry 704. For example, the guidance application may be an EBIF application. In some embodiments, the guidance application may be defined by a series of JAVA-based files that are received and run by a local virtual machine or other suitable middleware executed by control circuitry 704. In some of such embodiments (e.g., those employing MPEG-2 or other digital media encoding schemes), the guidance application may be, for example, encoded and transmitted in an MPEG-2 object carousel with the MPEG audio and video packets of a program.

Figure 8:
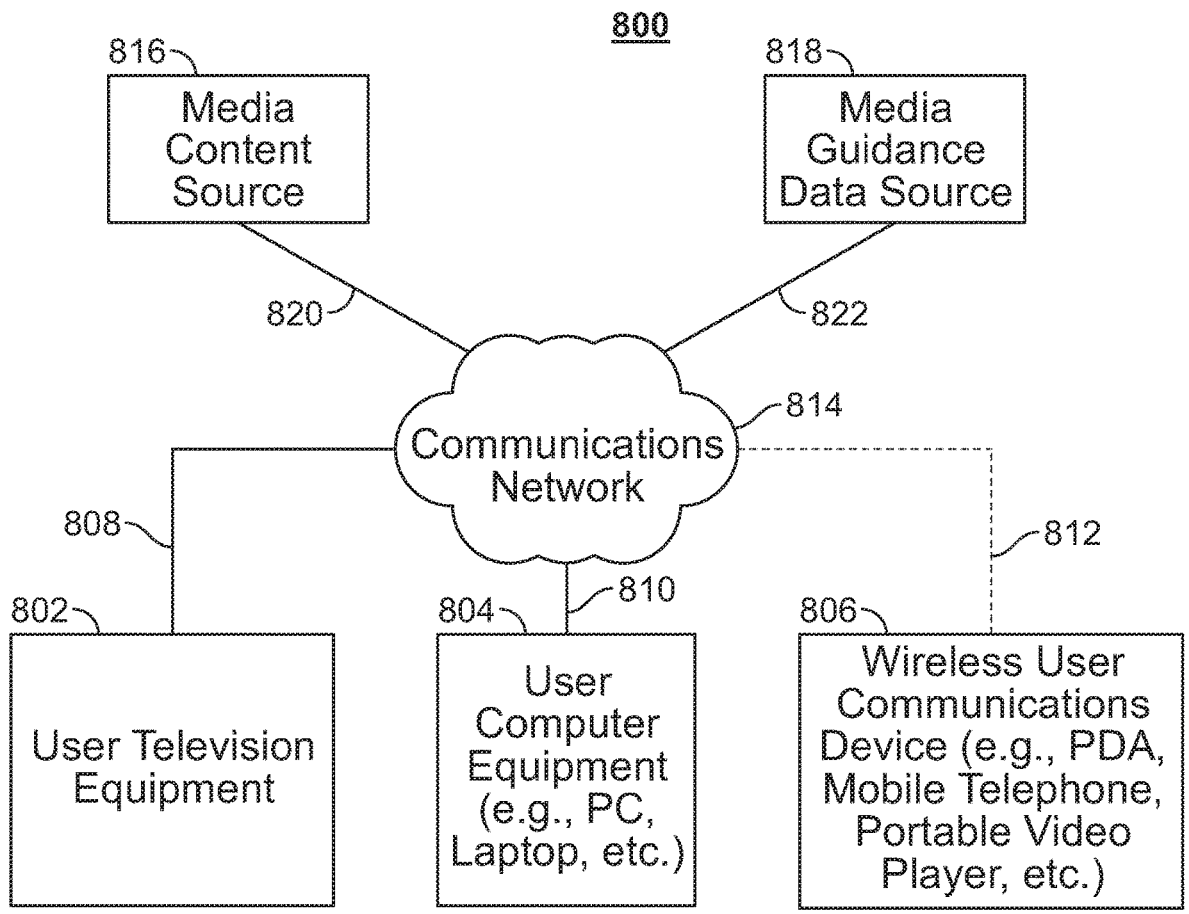
FIG. 8 is a block diagram of an illustrative media system in accordance with some embodiments of the disclosure.

User equipment device 700 of FIG. 7 can be implemented in system 800 of FIG. 8 as user television equipment 802, user computer equipment 804, wireless user communications device 806, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 802, user computer equipment 804, or a wireless user communications device 806. For example, user television equipment 802 may, like some user computer equipment 804, be Internet-enabled allowing for access to Internet content, while user computer equipment 804 may, like some television equipment 802, include a tuner allowing for access to television programming. The media guidance application may have the same layout on various different types of user equipment or may be tailored to the display capabilities of the user equipment. For example, on user computer equipment 804, the guidance application may be provided as a web site accessed by a web browser. In another example, the guidance application may be scaled down for wireless user communications devices 806.

In system 800, there is typically more than one of each type of user equipment device but only one of each is shown in FIG. 8 to avoid overcomplicating the drawing. In addition, each user may utilize more than one type of user equipment device and also more than one of each type of user equipment device.

In some embodiments, a user equipment device (e.g., user television equipment 802, user computer equipment 804, wireless user communications device 806) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 814. Namely, user television equipment 802, user computer equipment 804, and wireless user communications device 806 are coupled to communications network 814 via communications paths 808, 810, and 812, respectively. Communications network 814 may be one or more networks including the Internet, a mobile phone network, mobile voice or data network (e.g., a 4G or LTE network), cable network, public switched telephone network, or other types of communications network or combinations of communications networks. Paths 808, 810, and 812 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Path 812 is drawn with dotted lines to indicate that in the exemplary embodiment shown in FIG. 8 it is a wireless path and paths 808 and 810 are drawn as solid lines to indicate they are wired paths (although these paths may be wireless paths, if desired). Communications with the user equipment devices may be provided by one or more of these communications paths, but are shown as a single path in FIG. 8 to avoid overcomplicating the drawing.

Although communications paths are not drawn between user equipment devices, these devices may communicate directly with each other via communication paths, such as those described above in connection with paths 808, 810, and 812, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 814.

System 800 includes content source 816 and media guidance data source 818 coupled to communications network 814 via communication paths 820 and 822, respectively. Paths 820 and 822 may include any of the communication paths described above in connection with paths 808, 810, and 812. Communications with the content source 816 and media guidance data source 818 may be exchanged over one or more communications paths, but are shown as a single path in FIG. 8 to avoid overcomplicating the drawing. In addition, there may be more than one of each of content source 816 and media guidance data source 818, but only one of each is shown in FIG. 8 to avoid overcomplicating the drawing. (The different types of each of these sources are discussed below.) If desired, content source 816 and media guidance data source 818 may be integrated as one source device. Although communications between sources 816 and 818 with user equipment devices 802, 804, and 806 are shown as through communications network 814, in some embodiments, sources 816 and 818 may communicate directly with user equipment devices 802, 804, and 806 via communication paths (not shown) such as those described above in connection with paths 808, 810, and 812.

Content source 816 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 816 may be the originator of content (e.g., a television broadcaster, a Webcast provider, etc.) or may not be the originator of content (e.g., an on-demand content provider, an Internet provider of content of broadcast programs for downloading, etc.). Content source 816 may include cable sources, satellite providers, on-demand providers, Internet providers, over-the-top content providers, or other providers of content. Content source 816 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 818 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 818 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 818 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 818 may provide user equipment devices 802, 804, and 806 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 708, and executed by control circuitry 704 of a user equipment device 700. In some embodiments, media guidance applications may be client-server applications where only a client application resides on the user equipment device, and server application resides on a remote server. For example, media guidance applications may be implemented partially as a client application on control circuitry 704 of user equipment device 700 and partially on a remote server as a server application (e.g., media guidance data source 818) running on control circuitry of the remote server. When executed by control circuitry of the remote server (such as media guidance data source 818), the media guidance application may instruct the control circuitry to generate the guidance application displays and transmit the generated displays to the user equipment devices. The server application may instruct the control circuitry of the media guidance data source 818 to transmit data for storage on the user equipment. The client application may instruct control circuitry of the receiving user equipment to generate the guidance application displays.

Content and/or media guidance data delivered to user equipment devices 802, 804, and 806 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 800 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 8.

In one approach, user equipment devices may communicate with each other within a home network. User equipment devices can communicate with each other directly via short-range point-to-point communication schemes described above, via indirect paths through a hub or other similar device provided on a home network, or via communications network 814. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 816 to access content. Specifically, within a home, users of user television equipment 802 and user computer equipment 804 may access the media guidance application to navigate among and locate desirable content. Users may also access the media guidance application outside of the home using wireless user communications devices 806 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 814. These cloud resources may include one or more content sources 816 and one or more media guidance data sources 818. In addition or in the alternative, the remote computing sites may include other user equipment devices, such as user television equipment 802, user computer equipment 804, and wireless user communications device 806. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 804 or wireless user communications device 806 having content capture feature. Alternatively, the user can first transfer the content to a user equipment device, such as user computer equipment 804. The user equipment device storing the content uploads the content to the cloud using a data transmission service on communications network 814. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 7.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 9:
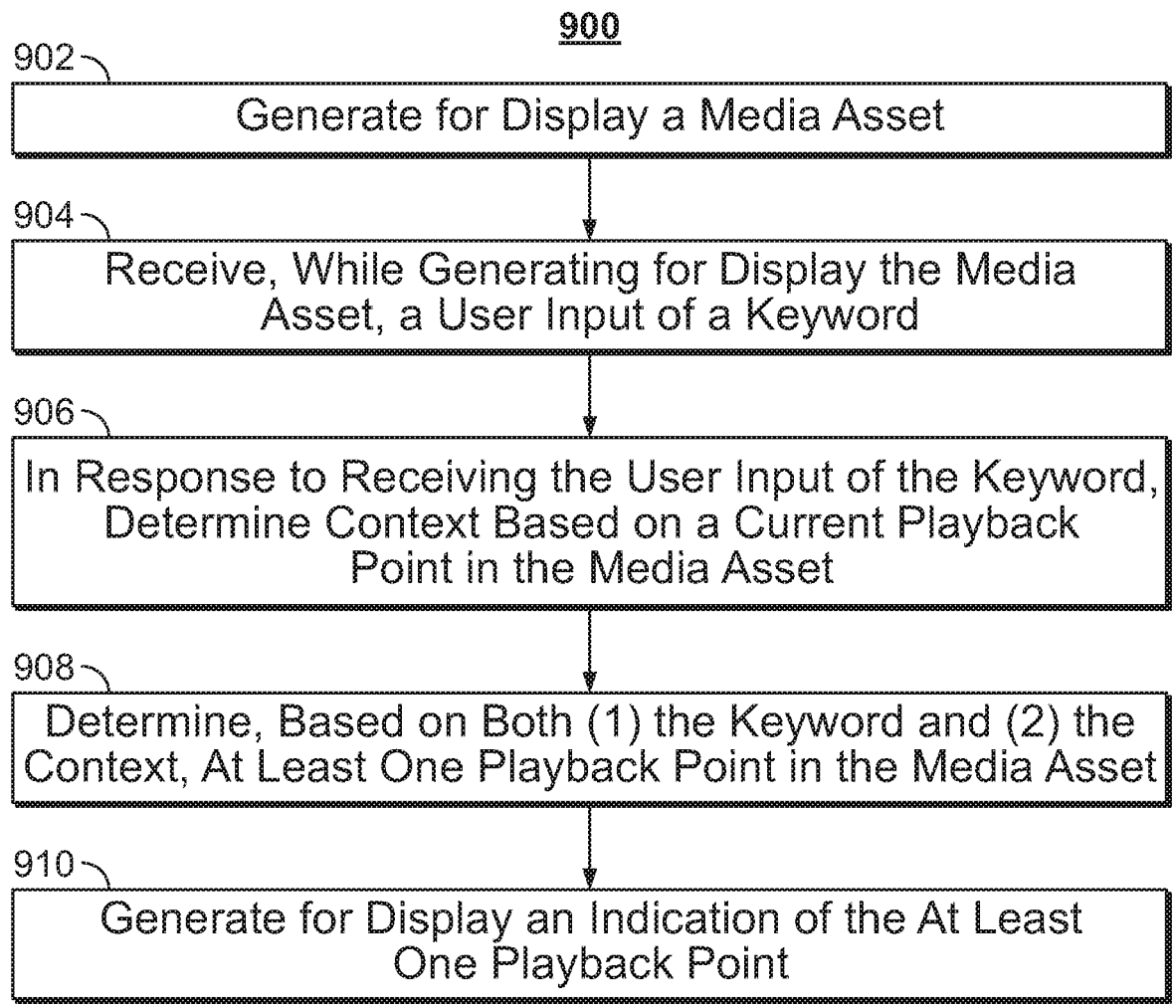
FIG. 9 is a flowchart of illustrative actions for determining playback points in media assets, in accordance with some embodiments of the disclosure.

FIG. 9 is a flowchart of illustrative actions for determining playback points in media assets, in accordance with some embodiments of the disclosure. For example, a media guidance application implementing process 900 may be executed by control circuitry 704 (FIG. 7). It should be noted that process 900 or any step thereof could be performed on, or provided by, any of the devices shown in FIGS. 7-8.

Process 900 begins at 902, where the media guidance application generates (e.g., via control circuitry 704 (FIG. 7)) for display (e.g., on display 712 (FIG. 7)) a media asset. For example, the media guidance application may generate (e.g., via control circuitry 704 (FIG. 7)) for display (e.g., on display 712 (FIG. 7)) the movie, "Edge of Tomorrow" on a display screen (e.g., of a tablet or television). In some embodiments, the media guidance application may generate (e.g., via control circuitry 704 (FIG. 7)) a media asset for display in response to receiving a user selection of the media asset via a user input interface (e.g., user input interface 710 (FIG. 7)).

Process 900 continues to 904, where the media guidance application receives (e.g., via control circuitry 704 (FIG. 7)), while generating for display the media asset, a user input of a keyword. For example, the media guidance application may receive (e.g., via control circuitry 704 (FIG. 7)) text, graphics, or a combination that identify at least one characteristic of the media asset. The characteristic may be any metadata relating to the media asset, such as a person associated with the media asset (e.g., actor, director, producer, etc.) and/or an identifier of the action (e.g., "car chase,"), and/or an identifier of a location (e.g., "Paris"). In some embodiments, the media guidance application may generate (e.g., via control circuitry 704 (FIG. 7)) for display (e.g., on display 712 (FIG. 7)) a field for text input of the keyword. For example, using a remote control (e.g., user input interface 710 (FIG. 7)), the user may input a string of characters (e.g., "Tom Cruise"), which the media guidance application may receive (e.g., via control circuitry 704 (FIG. 7)) as the keyword.

Process 900 continues to 906, where the media guidance application, in response to receiving the user input of the keyword, determines (e.g., via control circuitry 704 (FIG. 7)) context based on a current playback point in the media asset. For example, the media guidance application may retrieve (e.g., via control circuitry 704 (FIG. 7)) a time code (e.g., "00:30:00:00", in the format hours:minutes:seconds:frames) corresponding to the current playback point in the media asset (e.g., 30 minutes into the media asset). The media guidance application may then retrieve (e.g., via control circuitry 704 (FIG. 7)) metadata associated with the current playback point from local storage (e.g., storage 708 (FIG. 7)) or a remote server (e.g., media guidance data source 818 accessible via communications network 814 (FIG. 8)). The media guidance application may then use (e.g., via control circuitry 704 (FIG. 7)) the metadata at the current playback point retrieved from the data structure to assign a context to the keyword that the user has searched for, as described further below with respect to FIG. 12. As a specific example, the media guidance application may assign (e.g., via control circuitry 704 (FIG. 7)) the context "car chase" based on the metadata retrieved from the data structure.

Process 900 continues to 908, where the media guidance application determines (e.g., via control circuitry 704 (FIG. 7)), based on both (1) the keyword and (2) the context, at least one playback point in the media asset. For example, the media guidance application may search (e.g., via control circuitry 704 (FIG. 7)) the data structure containing metadata related to playback points in the media asset for a playback point that is associated with both an identifier of the context and an identifier of the keyword. As a specific example, the media guidance application may determine (e.g., via control circuitry 704 (FIG. 7)) that the keyword, "Tom Cruise" and the context "car chase" match values at a playback point of 55 minutes in the movie, "Edge of Tomorrow," based on comparison with metadata in the data structure associated with playback points in the media asset.

Process 900 continues to 910, where the media guidance application generates (e.g., via control circuitry 704 (FIG. 7)) for display (e.g., on display 712 (FIG. 7)) an indication of the at least one playback point. For example, the media guidance application may generate (e.g., via control circuitry 704 (FIG. 7)) indicators (e.g., tick marks) on a progress bar indicating the at least playback point that matches both the keyword and the context. As another example, the media guidance application may transmit (e.g., via control circuitry 704 (FIG. 7)) identifiers of the playback point to a device (e.g., any of user equipment described in FIGS. 7-8) that is not generating the media asset for display (e.g., the user is viewing a media asset on a television and the identifiers are transmitted to the user's mobile phone).

Figure 10:
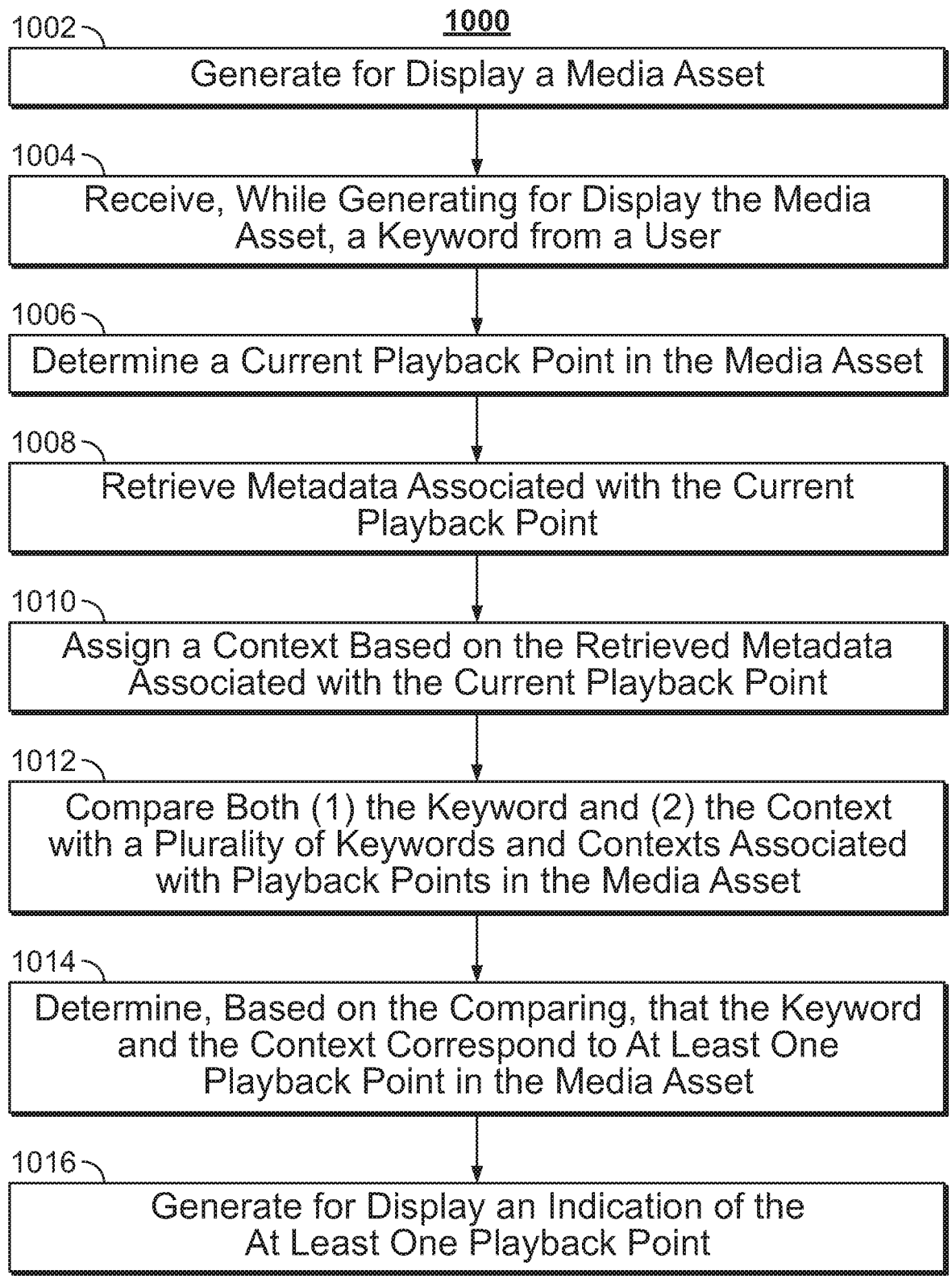
FIG. 10 is another flowchart of illustrative actions for determining playback points in media assets, in accordance with some embodiments of the disclosure.

FIG. 10 is another flowchart of illustrative actions for determining playback points in media assets, in accordance with some embodiments of the disclosure. For example, a media guidance application implementing process 1000 may be executed by control circuitry 704 (FIG. 7). It should be noted that process 1000 or any step thereof could be performed on, or provided by, any of the devices shown in FIGS. 7-8.

Process 1000 begins at 1002, where the media guidance application generates (e.g., via control circuitry 704 (FIG. 7)) for display (e.g., on display 712 (FIG. 7)) a media asset. For example, the media guidance application may generate (e.g., via control circuitry 704 (FIG. 7)) for display (e.g., on display 712 (FIG. 7)) the movie, "Edge of Tomorrow" on a display screen (e.g., of a tablet or television). In some embodiments, the media guidance application may generate (e.g., via control circuitry 704 (FIG. 7)) a media asset for display in response to receiving a user selection of the media asset via a user input interface (e.g., user input interface 710 (FIG. 7)).

Process 1000 continues to 1004, where the media guidance application receives (e.g., via control circuitry 704 (FIG. 7)), while generating for display the media asset, a keyword from a user. For example, the media guidance application may receive (e.g., via control circuitry 704 (FIG. 7)) text, graphics, or a combination that identify at least one characteristic of the media asset. The characteristic may be any metadata relating to the media asset, such as a person associated with the media asset (e.g., actor, director, producer, etc.) and/or an identifier of the action (e.g., "car chase,"), and/or an identifier of a location (e.g., "Paris"). In some embodiments, the media guidance application may generate (e.g., via control circuitry 704 (FIG. 7)) for display (e.g., on display 712 (FIG. 7)) a field for text input of the keyword. For example, using a remote control (e.g., user input interface 710 (FIG. 7)), the user may input a string of characters (e.g., "Tom Cruise"), which the media guidance application may receive (e.g., via control circuitry 704 (FIG. 7)) as the keyword.

Process 1000 continues to 1006, where the media guidance application determines (e.g., via control circuitry 704 (FIG. 7)) a current playback point in the media asset. For example, the media guidance application may retrieve (e.g., via control circuitry 704 (FIG. 7)) a time code (e.g., "00:30:00:00", in the format hours:minutes:seconds:frames) corresponding to the current playback point in the media asset (e.g., 30 minutes into the media asset). The media guidance application may retrieve (e.g., via control circuitry 704 (FIG. 7)) the time code from a time code signal in the media asset containing a set of binary coded decimal values referring to the present playback position in the media asset.

Process 1000 continues to 1008, where the media guidance application retrieves (e.g., via control circuitry 704 (FIG. 7)) metadata associated with the current playback point. For example, the media guidance application may retrieve (e.g., via control circuitry 704 (FIG. 7)) metadata associated with the current playback point from local storage (e.g., storage 708 (FIG. 7)) or a remote server (e.g., media guidance data source 818 accessible via communications network 814 (FIG. 8)). The metadata may be organized in a table or other data structure. For example, the media guidance application may retrieve (e.g., via control circuitry 704 (FIG. 7)) a data structure specific to the media asset currently being generated for display. The metadata may be organized in a table, where each row of the table relates to a particular playback point or range of playback points and each field in the row contains a particular value (e.g., a string of characters). The values may be any character or string of characters that describe the current playback point in the media asset. For example, the metadata may be a song currently playing in the media asset, a location of a scene in the media asset, a general description of the current action (e.g., "car chase"), or an actor appearing at that time in the media asset. The media guidance application may compare (e.g., via control circuitry 704 (FIG. 7)) the value for the current playback point (e.g., a time code) with values in the data structure storing metadata associated with playback points in the media asset, as described further below with respect to FIG. 11. The media guidance application may determine (e.g., via control circuitry 704 (FIG. 7)), based on the comparison, a particular field or fields of metadata that relate to the media asset at the current playback point. For example, the media guidance application may determine (e.g., via control circuitry 704 (FIG. 7)) that the current playback point of 30 minutes into the movie, "Edge of Tomorrow" matches a stored playback point in the data structure and may retrieve the string, "Tom Cruise" from an associated field.

Process 1000 continues to 1010, where the media guidance application assigns (e.g., via control circuitry 704 (FIG. 7)) a context based on the retrieved metadata associated with the current playback point. For example, the media guidance application may use (e.g., via control circuitry 704 (FIG. 7)) the metadata at the current playback point to assign a context to the keyword that the user has searched for, as described further below with respect to FIG. 12. As a specific example, the media guidance application may assign (e.g., via control circuitry 704 (FIG. 7)) the context "car chase" based on the metadata retrieved from the data structure.

Process 1000 continues to 1012, where the media guidance application compares (e.g., via control circuitry 704 (FIG. 7)) both (1) the keyword and (2) the context with a plurality of keywords and contexts associated with playback points in the media asset. For example, the media guidance application may search (e.g., via control circuitry 704 (FIG. 7)) the data structure containing metadata related to playback points in the media asset for a playback point that is associated with both an identifier of the context and an identifier of the keyword. The media guidance application may compare (e.g., via control circuitry 704 (FIG. 7)) characters of the context and keyword with characters of contexts and keywords stored in fields of the data structure. If both the context and keyword match values stored in fields for the same playback point, the media guidance application may determine (e.g., via control circuitry 704 (FIG. 7)) that the playback point is a match, as described further below with respect to FIG. 13.

Process 1000 continues to 1014, where the media guidance application determines (e.g., via control circuitry 704 (FIG. 7)), based on the comparing, that the keyword and the context correspond to at least one playback point in the media asset. For example, the media guidance application may determine (e.g., via control circuitry 704 (FIG. 7)) that the keyword, "Tom Cruise" and the context "car chase" match values at a playback point of 55 minutes in the movie, "Edge of Tomorrow," based on comparison with metadata in the data structure associated with playback points in the media asset.

Process 1000 continues to 1014, where the media guidance application generates (e.g., via control circuitry 704 (FIG. 7)) for display (e.g., on display 712 (FIG. 7)) an indication of the at least one playback point. For example, the media guidance application may generate (e.g., via control circuitry 704 (FIG. 7)) indicators (e.g., tick marks) on a progress bar indicating the at least one playback point that matches both the keyword and the context. As another example, the media guidance application may transmit (e.g., via control circuitry 704 (FIG. 7)) identifiers of the playback point to a device (e.g., any of user equipment described in FIGS. 7-8) that is not generating the media asset for display (e.g., the user is viewing a media asset on a television and the identifiers are transmitted to the user's mobile phone).

Figure 11:
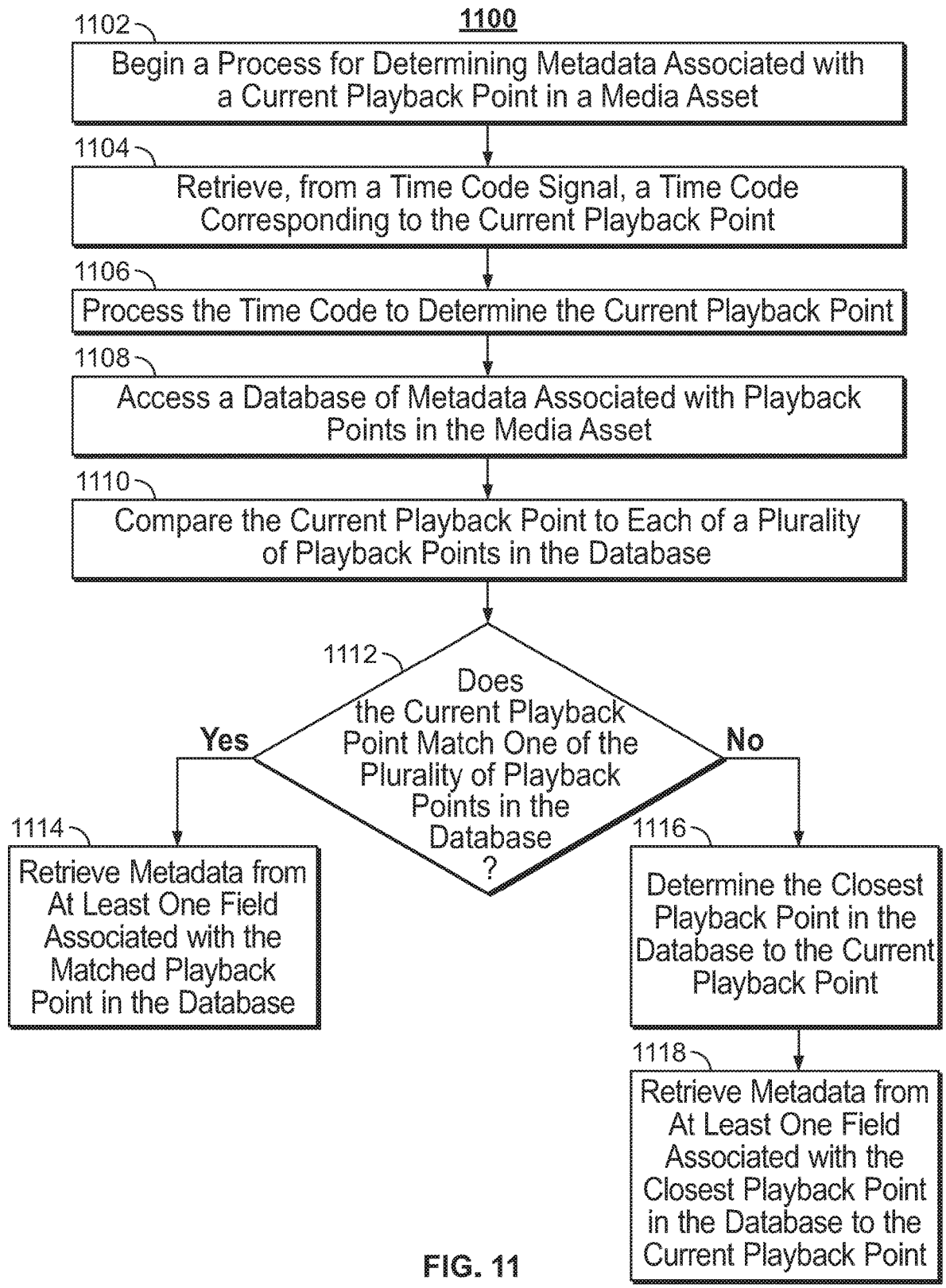
FIG. 11 is a flowchart of illustrative actions for determining metadata associated with a current playback point in a media asset, in accordance with some embodiments of the disclosure.

FIG. 11 is a flowchart of illustrative actions for determining metadata associated with a current playback point in a media asset, in accordance with some embodiments of the disclosure. For example, a media guidance application implementing process 1100 may be executed by control circuitry 704 (FIG. 7). It should be noted that process 1100 or any step thereof could be performed on, or provided by, any of the devices shown in FIGS. 7-8. Process 1100 starts at 1102, where the media guidance application begins (e.g., via control circuitry 704 (FIG. 7)) a process for determining metadata associated with a current playback point in a media asset. For example, the media guidance application may initialize the necessary variables and execute (e.g., via control circuitry 704 (FIG. 7)) a program script calling a particular method to execute process 1100.

Process 1100 continues to 1104, where the media guidance application retrieves (e.g., via control circuitry 704 (FIG. 7)), from a time code signal, a time code corresponding to the current playback point. For example, the media guidance application may retrieve (e.g., via control circuitry 704 (FIG. 7)) a time code (e.g., "00:30:00:00", in the format hours:minutes:seconds:frames) corresponding to the current playback point in the media asset (e.g., 30 minutes into the media asset). The media guidance application may retrieve (e.g., via control circuitry 704 (FIG. 7)) the time code from a time code signal in the media asset containing a set of binary coded decimal values referring to the current playback position in the media asset.

Process 1100 continues to 1106, where the media guidance application processes (e.g., via control circuitry 704 (FIG. 7)) the time code to determine the current playback point. For example, the media guidance application may determine (e.g., via control circuitry 704 (FIG. 7)) that a particular signal or header in a data packet contains binary coded decimal values relating to a time code and retrieve those values. The media guidance application may convert (e.g., via control circuitry 704 (FIG. 7)) each binary coded decimal value to a corresponding decimal value corresponding to the time code. For example, the media guidance application may determine (e.g., via control circuitry 704 (FIG. 7)) that four particular bits relating to one value in the time code are "1001" which may correspond to the value "9" in the time code.

Process 1100 continues to 1108, where the media guidance application accesses (e.g., via control circuitry 704 (FIG. 7)) a database of metadata associated with playback points in the media asset. For example, the media guidance application may access (e.g., via control circuitry 704 (FIG. 7)) a database containing metadata associated with the current playback point in local storage (e.g., storage 708 (FIG. 7)) or at a remote server (e.g., media guidance data source 818 accessible via communications network 814 (FIG. 8)). The database may be organized as a table, where each row of the table relates to a particular playback point or range of playback points for a media asset and each field in the row contains a particular value (e.g., a string of characters). The values may be any character or string of characters that describe the current playback point in the media asset.

Process 1100 continues to 1110, where the media guidance application compares (e.g., via control circuitry 704 (FIG. 7)) the current playback point to each of a plurality of playback points in the database. For example, the media guidance application may compare (e.g., via control circuitry 704 (FIG. 7)) the integer value(s) for the current playback point (e.g., 00 hours, 30 minutes, 30 seconds) with values stored in the database to determine whether the values correspond. As a specific example, the media guidance application may determine (e.g., via control circuitry 704 (FIG. 7)) that an entry in the database is for a playback point of 30 minutes and 30 seconds and that, since the current playback point is also 30 minutes and 30 seconds, the playback points match and metadata associated with the entry applies to the current playback point.

Process 1100 continues to 1112, where the media guidance application determines (e.g., via control circuitry 704 (FIG. 7)) whether the current playback point matches one of the plurality of playback points in the database. For example, the media guidance application may determine (e.g., via control circuitry 704 (FIG. 7)) a match between the current playback point and a stored playback point if every value associated with the current playback point exactly matches every value associated with a stored playback point. As a specific example, if the playback point is for 30 minutes and 30 seconds and an entry is for 30 minutes and 35 seconds, the media guidance application may determine (e.g., via control circuitry 704 (FIG. 7)) that the playback points do not match since 35 does not equal 30. In some embodiments, the database includes a range of playback points (e.g., 30 minutes to 35 minutes relates to specific metadata). In this situation, the media guidance application may determine (e.g., via control circuitry 704 (FIG. 7)) a match if the current playback point falls within the range (e.g., 32 minutes is within the 30 to 35 minute range).

If, at 1112, the media guidance application determines that the current playback point does match one of the plurality of playback points in the database, process 1100 continues to 1114, where the media guidance application retrieves (e.g., via control circuitry 704 (FIG. 7)) metadata from at least one field associated with the matched playback point in the database. For example, upon determining a match, the media guidance application may retrieve (e.g., via control circuitry 704 (FIG. 7)) data from one or more fields associated with the matched playback point in the database. Specifically, the media guidance application may execute (e.g., via control circuitry 704 (FIG. 7)) a database query language script, such as an SQL script, to retrieve data from particular fields containing metadata related to the matched playback point.

If, at 1112, the media guidance application determines that the current playback point does not match one of the plurality of playback points in the database, process 1100 continues to 1116, where the media guidance application determines (e.g., via control circuitry 704 (FIG. 7)) the closest playback point in the database to the current playback point. In some cases, no playback point in the database will exactly match the current playback point. In this situation, the media guidance application may determine (e.g., via control circuitry 704 (FIG. 7)) the closest playback point to the current playback point. For example, the media guidance application may subtract (e.g., via control circuitry 704 (FIG. 7)) every playback point stored in the database from the current playback point. The media guidance application may determine (e.g., via control circuitry 704 (FIG. 7)) the closest playback point based on the playback point that has the smallest absolute difference from the current playback point.

Process 1100 continues to 1118, where the media guidance application retrieves (e.g., via control circuitry 704 (FIG. 7)) metadata from at least one field associated with the closest playback point in the database to the current playback point. For example, upon determining the closest playback point, the media guidance application may retrieve (e.g., via control circuitry 704 (FIG. 7)) data from one or more fields associated with the closest playback point in the database. Specifically, the media guidance application may execute (e.g., via control circuitry 704 (FIG. 7)) a database query language script, such as an SQL script, to retrieve data from particular fields containing metadata related to the closest playback point.

Figure 12:
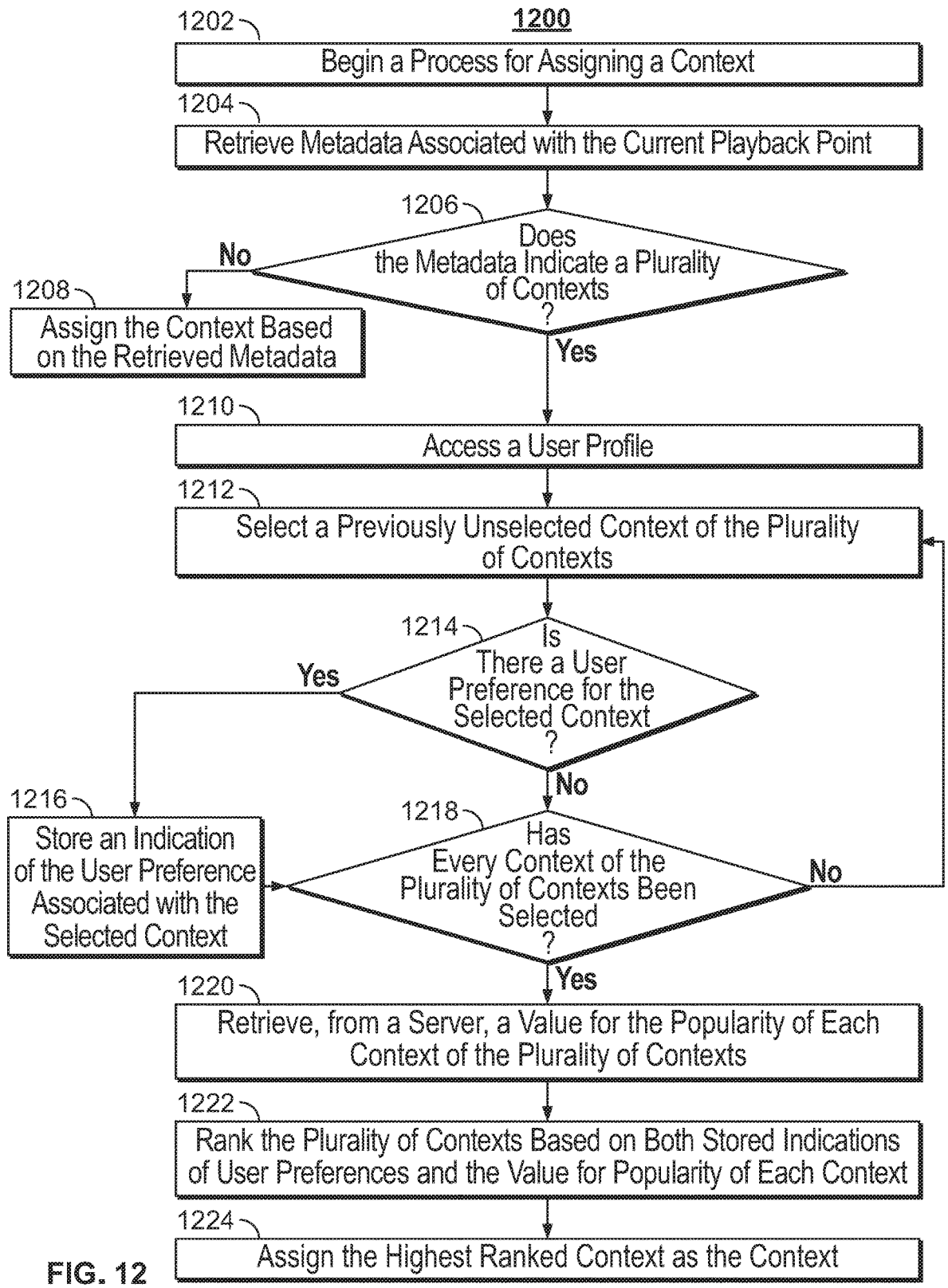
FIG. 12 is a flowchart of illustrative actions for assigning a context, in accordance with some embodiments of the disclosure.

FIG. 12 is a flowchart of illustrative actions for assigning a context, in accordance with some embodiments of the disclosure. For example, a media guidance application implementing process 1200 may be executed by control circuitry 704 (FIG. 7). It should be noted that process 1200 or any step thereof could be performed on, or provided by, any of the devices shown in FIGS. 7-8. Process 1200 starts at 1202, where the media guidance application begins (e.g., via control circuitry 704 (FIG. 7)) a process for assigning a context. For example, the media guidance application may initialize the necessary variables and execute (e.g., via control circuitry 704 (FIG. 7)) a program script calling a particular method to execute process 1200.

Process 1200 continues to 1204, where the media guidance application retrieves (e.g., via control circuitry 704 (FIG. 7)) metadata associated with the current playback point. For example, as described above with respect to FIGS. 9-11, the media guidance application may retrieve (e.g., via control circuitry 704 (FIG. 7)) strings of characters associated with the current playback point from a database in local storage (e.g., storage 708 (FIG. 7)) or at a remote server (e.g., media guidance data source 818 accessible via communications network 814 (FIG. 8)).

Process 1200 continues to 1206, where the media guidance application determines (e.g., via control circuitry 704 (FIG. 7)) whether the metadata indicates a plurality of contexts. For example, the media guidance application may determine (e.g., via control circuitry 704 (FIG. 7)) whether multiple strings of characters were retrieved from the database (e.g., multiple pieces of metadata are associated with the current playback point).

If, at 1206, the media guidance application determines that the metadata does not indicate a plurality of contexts, then process 1200 continues to 1208, where the media guidance application assigns (e.g., via control circuitry 704 (FIG. 7)) the context based on the retrieved metadata. For example, if only one string of characters was retrieved by the media guidance application from the database, the media guidance application may assign (e.g., via control circuitry 704 (FIG. 7)) the retrieved string of characters as the context since it is the only possibility for the context. As a specific example, if the media guidance application only retrieves (e.g., via control circuitry 704 (FIG. 7)) "gun fight" as the metadata associated with the current playback point, then the media guidance application may assign "gun fight" as the context.

If, at 1206, the media guidance application determines that the metadata does indicate a plurality of contexts, then process 1200 continues to 1210, where the media guidance application accesses (e.g., via control circuitry 704 (FIG. 7)) a user profile. For example, the media guidance application may determine (e.g., via control circuitry 704 (FIG. 7)) that since both "car-chase" and "gun fight" were retrieved for a particular playback point, there are a plurality of contexts that are associated with the current playback point and additional data is needed to choose which context to assign. The media guidance application may then access a user profile, stored locally in storage (e.g., storage 708 (FIG. 7)) or remotely (e.g., at media guidance data source 818 accessible via communications network 814 (FIG. 8)) to determine whether the user has a preference for one or more of the contexts.

Process 1200 continues to 1212, where the media guidance application selects (e.g., via control circuitry 704 (FIG. 7)) a previously unselected context of the plurality of contexts. For example, the media guidance application may execute (e.g., via control circuitry 704 (FIG. 7)) an instruction to iteratively retrieve (e.g., by utilizing a for-loop) each identifier of a context retrieved from the database of metadata to determine which context matches user preferences in a user profile.

Process 1200 continues to 1214, where the media guidance application determines (e.g., via control circuitry 704 (FIG. 7)) if there is a user preference for the selected context. For example, the media guidance application may retrieve (e.g., via control circuitry 704 (FIG. 7)) one or more context preferences of the user from the user profile and compare characters of each context from the user profile to characters of each of the multiple context preferences for the current playback point. The media guidance application may determine (e.g., via control circuitry 704 (FIG. 7)) a match based on a threshold percentage (e.g., 90%) of the characters matching between two contexts.

If, at 1214, the media guidance application determines that there is a user preference for the selected context, process 1200 continues to 1216, where the media guidance application stores (e.g., via control circuitry 704 (FIG. 7)) an indication of the user preference associated with the selected context. For example, the media guidance application may determine (e.g., via control circuitry 704 (FIG. 7)) that the user has a preference (e.g., based on the user profile) for "gun-fights" and that one of the plurality of contexts at the current playback point is a "gun-fight." Accordingly, the media guidance application may, since the context "gun-fight" corresponds to a user preference, store (e.g., via control circuitry 704 (FIG. 7)) an indication that the user has a preference for the context. The indication may be a Boolean (e.g., set to "true") or may be a numeric value indicating how preferred the context is. For example, if every media asset the user has consumed includes gun fights based on a viewing history, the user may have a stronger preference for gun fights than if only some of the media assets consumed by the user included gun fights and the media guidance application may assign (e.g., via control circuitry 704 (FIG. 7)) a larger numeric value for the former case than the latter. Process 1200 then proceeds to 1218.

If, at 1214, the media guidance application determines that there is not a user preference for the selected context, process 1200 continues to 1218, where the media guidance application determines (e.g., via control circuitry 704 (FIG. 7)) if every context of the plurality of contexts has been selected. As discussed above with respect to 1212, the media guidance application may execute (e.g., via control circuitry 704 (FIG. 7)) an instruction to iteratively retrieve (e.g., by utilizing a for-loop) each identifier of a context retrieved from the database of metadata. If the loop executed by the media guidance application terminates, the media guidance application may determine that every context has been retrieved. If, at 1218, the media guidance application determines that not every context has been selected, process 1200 returns to 1212, where the media guidance application selects (e.g., via control circuitry 704 (FIG. 7)) a previously unselected context of the plurality of contexts, as described above.

If, at 1218, the media guidance application determines that every context has been selected, process 1200 continues to 1220, where the media guidance application retrieves (e.g., via control circuitry 704 (FIG. 7)), from a server, a value for the popularity of each context of the plurality of contexts. For example, the media guidance application may access the server (e.g., media guidance data source 818 (FIG. 8)) via a communications network (e.g., communications network 814 (FIG. 8)). The media guidance application may compare (e.g., via control circuitry 704 (FIG. 7)) characters of each of the plurality of contexts with characters of strings corresponding to contexts in the data structure. Upon determining a match, the media guidance application may retrieve (e.g., via control circuitry 704 (FIG. 7)), from an associated field, a popularity value. The popularity value may be a ranking (e.g., $3^{rd}$ most popular based on searches in the past month), number (e.g., the number of times the particular context has been searched/requested over a period of time), or any other numeric value that allows two contexts to be differentiated as more or less popular.

Process 1200 continues to 1222, where the media guidance application ranks (e.g., via control circuitry 704 (FIG. 7)) the plurality of contexts based on both stored indications of user preferences and the value for popularity of each context. For example, the media guidance application may assign (e.g., via control circuitry 704 (FIG. 7)) a score to each context based on the stored indications of whether the user has a preference for the context and the popularity value for the context. The media guidance application may then sort (e.g., via control circuitry 704 (FIG. 7)) the scores to determine a ranking for the plurality of contexts, using a sorting algorithm such as a bubble sort.

Process 1200 continues to 1224, where the media guidance application assigns (e.g., via control circuitry 704 (FIG. 7)) the highest ranked context as the context. For example, the media guidance application may retrieve (e.g., via control circuitry 704 (FIG. 7)) an identifier of the highest ranked context to assign as the context. As a specific example, the media guidance application may retrieve (e.g., via control circuitry 704 (FIG. 7)) that "gun fight" has the highest ranking and thus assigns "gun fight" as the context.

Figure 13:
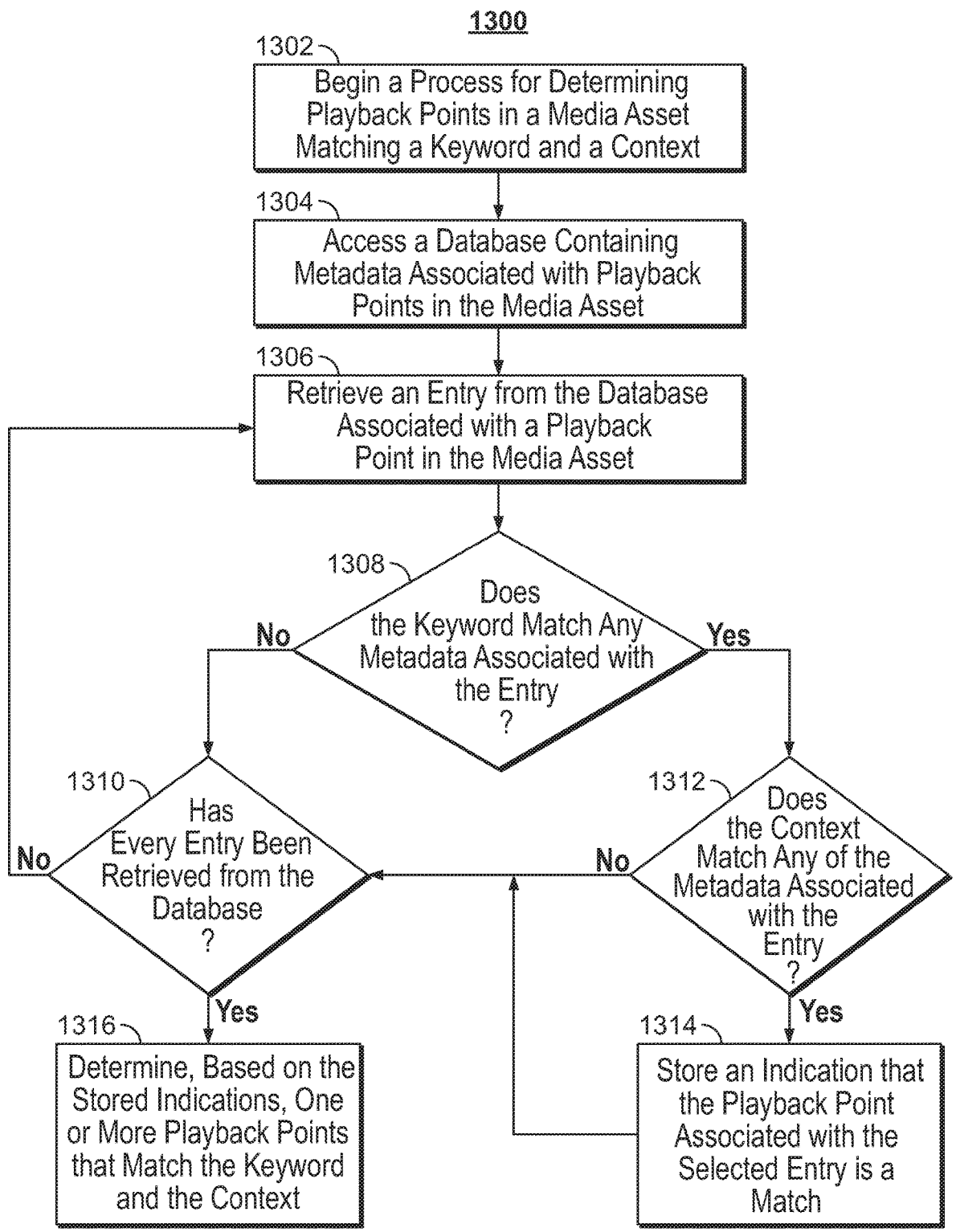
FIG. 13 is another flowchart of illustrative actions for determining playback points in a media asset matching a keyword and a context, in accordance with some embodiments of the disclosure.

FIG. 13 is a flowchart of illustrative actions for determining playback points in a media asset matching a keyword and a context, in accordance with some embodiments of the disclosure. For example, a media guidance application implementing process 1300 may be executed by control circuitry 704 (FIG. 7). It should be noted that process 1300 or any step thereof could be performed on, or provided by, any of the devices shown in FIGS. 7-8. Process 1300 starts at 1302, where the media guidance application begins (e.g., via control circuitry 704 (FIG. 7)) a process for determining playback points in a media asset matching a keyword and a context. For example, the media guidance application may initialize the necessary variables and execute (e.g., via control circuitry 704 (FIG. 7)) a program script calling a particular method to execute process 1300.

Process 1300 continues to 1304, where the media guidance application accesses (e.g., via control circuitry 704 (FIG. 7)) a database containing metadata associated with playback points in the media asset. For example, the media guidance application may access (e.g., via control circuitry 704 (FIG. 7)) the database containing metadata related to playback points in the media asset in local storage (e.g., storage 708 (FIG. 7)) or at a remote server (e.g., media guidance data source 818 accessible via communications network 814 (FIG. 8)).

Process 1300 continues to 1306, where the media guidance application retrieves (e.g., via control circuitry 704 (FIG. 7)) an entry from the database associated with a playback point in the media asset. For example, the media guidance application may execute (e.g., via control circuitry 704 (FIG. 7)) an instruction to iteratively retrieve (e.g., by utilizing a for-loop) each entry in the database of metadata to determine which entries correspond to playback points that match both the context and the keyword.

Process 1300 continues to 1308, where the media guidance application determines (e.g., via control circuitry 704 (FIG. 7)) if the keyword matches any metadata associated with the entry. For example, the media guidance application may compare (e.g., via control circuitry 704 (FIG. 7)) characters of the keyword (e.g., "Tom Cruise") with characters retrieved from fields of the selected entry. If a threshold amount of the characters match between a given field of the entry and the keyword, then the media guidance application may determine (e.g., via control circuitry 704 (FIG. 7)) a match.

If, at 1308, the media guidance application determines that the keyword does not match metadata associated with the entry, then process 1300 continues to 1310, where the media guidance application determines (e.g., via control circuitry 704 (FIG. 7)) whether every entry has been retrieved from the database. As discussed above with respect to 1306, the media guidance application may execute (e.g., via control circuitry 704 (FIG. 7)) an instruction to iteratively retrieve (e.g., by utilizing a for-loop) each entry in the database of metadata to determine which entries correspond to playback points that match both the context and the keyword. If the loop executed by the media guidance application terminates, the media guidance application may determine (e.g., via control circuitry 704 (FIG. 7)) that every entry has been retrieved. If the loop has not terminated, the media guidance application may return to 1306 and retrieve (e.g., via control circuitry 704 (FIG. 7)) another entry that has previously not been retrieved from the database.

If, at 1310, the media guidance application determines that every entry has been retrieved from the database, process 1300 continues to 1316, where the media guidance application determines (e.g., via control circuitry 704 (FIG. 7)), based on the stored indications, one or more playback points that match the keyword and the context. For example, for each entry that matches both the keyword and context, the media guidance application may store (e.g., via control circuitry 704 (FIG. 7)) an indication of the playback point. The media guidance application may return (e.g., via control circuitry 704 (FIG. 7)) the one or more playback points that match the keyword and context once every entry has been retrieved, such that the playback points may be generated for display, as described above in FIGS. 2, 4, and 9-10.

If, at 1308, the media guidance application determines that the keyword does match metadata associated with the entry, then process 1300 continues to 1312, where the media guidance application determines (e.g., via control circuitry 704 (FIG. 7)) if the context matches any of the metadata associated with the entry. For example, the media guidance application may compare (e.g., via control circuitry 704 (FIG. 7)) characters of the context (e.g., "gun fight") with characters retrieved from fields of the selected entry. If a threshold amount of the characters match between a given field of the entry and the context, then the media guidance application may determine (e.g., via control circuitry 704 (FIG. 7)) a match.

If, at 1312, the media guidance application determines that the context matches the metadata associated with the entry, process 1300 continues to 1314, where the media guidance application stores (e.g., via control circuitry 704 (FIG. 7)) an indication that the playback point associated with the selected entry is a match. For example, the media guidance application may store (e.g., via control circuitry 704 (FIG. 7)) an indication in a list, array, or other data structure of each playback point that matches both the keyword and the context. Process 1300 then returns to 1310, described above. If, at 1312, the media guidance application determines that the context does not match the metadata associated with the entry, process 1300 continues to 1310, where the media guidance application determines (e.g., via control circuitry 704 (FIG. 7)) whether every entry has been retrieved from the database, as described above.

It is contemplated that the steps or descriptions of each of FIGS. 9-13 may be used with any other embodiment of this disclosure. In addition, the steps and descriptions described in relation to FIGS. 9-13 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 7-8 could be used to perform one or more of the steps in FIGS. 9-13.

While some portions of this disclosure may make reference to "convention," any such reference is merely for the purpose of providing context to the invention(s) of the instant disclosure, and does not form any admission as to what constitutes the state of the art.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for determining playback points in media assets, the method comprising:
   generating for display a first media asset;
   receiving, while generating for display the first media asset, a keyword from a user;
   in response to receiving the keyword from the user:
      determining a current playback point in the first media asset;
      retrieving metadata associated with the current playback point; and
      assigning a context based on the retrieved metadata associated with the current playback point;
   comparing both (1) the keyword and (2) the context with a plurality of keywords and contexts associated with playback points in each of a plurality of other media assets;
   determining, based on the comparing, that the keyword and the context correspond to at least one playback point in each of the plurality of other media assets;
   generating, for each of the plurality of other media assets, an indication that the keyword and the context correspond to at least one playback point;
   detecting a selection of a first indication of the indications, wherein the first indication is associated with a second media asset of the plurality of other media assets; and
   in response to the detection of the selection of the first indication, generating for display media guidance data for the second media asset.

2. The method of claim 1, wherein the media guidance data comprises a respective content source for the second media asset.

3. The method of claim 1, further comprising:
   in response to receiving the keyword from the user:
      comparing attributes of the keyword with attributes of each of a plurality of keywords related to the first media asset;
      determining a subset of the plurality of keywords that have an attribute that matches an attribute of the keyword; and
      generating for display the subset of the plurality of keywords.

4. The method of claim 1, wherein the keyword is a first keyword, and wherein assigning the context comprises:
   receiving, while generating for display the first media asset, a second keyword from the user;
   determining, based on characteristics of the first keyword and characteristics of the second keyword, a keyword context linking the first keyword with the second keyword; and
   assigning the context based on both (1) the keyword context and (2) the retrieved metadata associated with the current playback point.

5. The method of claim 1, wherein assigning the context based on the retrieved metadata associated with the current playback point comprises:
   determining, based on the retrieved metadata, that a plurality of contexts correspond to the current playback point;
   retrieving, from a user profile, a context preference;
   determining that the context preference matches a first context of the plurality of contexts; and
   assigning the first context as the context.

6. The method of claim 1, wherein assigning the context based on the retrieved metadata associated with the current playback point comprises:

determining, based on the retrieved metadata, that a plurality of contexts correspond to the current playback point;
retrieving, from a server, an indication of popularity for each of the plurality of contexts;
determining, based on the retrieved indication of popularity for each of the plurality of contexts, a most popular context; and
assigning the most popular context as the context.

7. The method of claim 1, wherein determining that the keyword and the context correspond to the at least one playback point in each of the plurality of other media assets comprises:
determining a number of the at least one playback point that correspond to the keyword and the context;
comparing the number to a threshold number;
determining that the number exceeds the threshold number; and
in response to determining that the number exceeds the threshold number, generating for display a subset of the at least one playback point, wherein the subset includes only playback points within a threshold amount of time from the current playback point.

8. The method of claim 1, wherein generating the indication of the at least one playback point comprises:
generating for display a progress bar overlaid on one or more of the other media assets;
determining locations on the progress bar corresponding to each of the at least one playback point; and
generating for display, at each of the locations on the progress bar, the indication.

9. The method of claim 1, wherein the media guidance data is generated for display on a first device, and wherein generating for display the media guidance data comprises:
determining that a number of the at least one playback point that correspond to the keyword and the context exceed a threshold number to display on the first device;
in response to determining that the number exceeds the threshold number to display on the first device, determining a second device associated with the user; and
transmitting data associated with one or more of the at least one playback points to the second device to be displayed by the second device.

10. The method of claim 1, wherein the media guidance data comprises parental controls for the second media asset.

11. A system for determining playback points in media assets, the system comprising:
user input circuitry; and
control circuitry configured to:
generate for display a first media asset;
receive, while generating for display the first media asset, a keyword from a user;
in response to receiving the keyword from the user:
determine a current playback point in the first media asset;
retrieve metadata associated with the current playback point; and
assign a context based on the retrieved metadata associated with the current playback point;
compare both (1) the keyword and (2) the context with a plurality of keywords and contexts associated with playback points in each of a plurality of other media assets;
determine, based on the comparison, that the keyword and the context correspond to at least one playback point in each of the plurality of other media assets;
generate, for each of the other media assets, an indication that the keyword and the context correspond to at least one playback point;
detect a selection of a first indication of the indications, wherein the first indication is associated with a second media asset of the plurality of other media assets; and
in response to the detection of the selection of the first indication, generate for display media guidance data for the second media asset.

12. The system of claim 11, wherein the media guidance data comprises a respective content source for the second media asset.

13. The system of claim 11, wherein the control circuitry is further configured to:
in response to receiving the keyword from the user:
compare attributes of the keyword with attributes of each of a plurality of keywords related to the first media asset;
determine a subset of the plurality of keywords that have an attribute that matches an attribute of the keyword; and
generate for display the subset of the plurality of keywords.

14. The system of claim 11, wherein the keyword is a first keyword, and wherein the control circuitry is further configured, when assigning the context, to:
receive, while generating for display the first media asset, a second keyword from the user;
determine, based on characteristics of the first keyword and characteristics of the second keyword, a keyword context linking the first keyword with the second keyword; and
assign the context based on both (1) the keyword context and (2) the retrieved metadata associated with the current playback point.

15. The system of claim 11, wherein the control circuitry is further configured, when assigning the context based on the retrieved metadata associated with the current playback point, to:
determine, based on the retrieved metadata, that a plurality of contexts correspond to the current playback point;
retrieve, from a user profile, a context preference;
determine that the context preference matches a first context of the plurality of contexts; and
assign the first context as the context.

16. The system of claim 11, wherein the control circuitry is further configured, when assigning the context based on the retrieved metadata associated with the current playback point, to:
determine, based on the retrieved metadata, that a plurality of contexts correspond to the current playback point;
retrieve, from a server, an indication of popularity for each of the plurality of contexts;
determine, based on the retrieved indication of popularity for each of the plurality of contexts, a most popular context; and
assign the most popular context as the context.

17. The system of claim 11, wherein the control circuitry is further configured, when determining that the keyword and the context correspond to the at least one playback point in each of the plurality of media asset, to:
determine a number of the at least one playback point that correspond to the keyword and the context;
compare the number to a threshold number;

determine that the number exceeds the threshold number; and in response to determining that the number exceeds the threshold number, generate for display a subset of the at least one playback point, wherein the subset includes only playback points within a threshold amount of time from the current playback point.

18. The system of claim 11, wherein the control circuitry is further configured, when generating for display the indication of the at least one playback point, to:

generate for display a progress bar overlaid on one or more of the other media assets;

determine locations on the progress bar corresponding to each of the at least one playback point; and generate for display, at each of the locations on the progress bar, the indication.

19. The system of claim 11, wherein the media guidance data is generated for display on a first device, and wherein the control circuitry is further configured, when generating for display the media guidance data, to:

determine that a number of the at least one playback point that correspond to the keyword and the context exceed a threshold number to display on the first device;

in response to determining that the number exceeds the threshold number to display on the first device, determine a second device associated with the user; and transmit data associated with one or more of the at least one playback points to the second device to be displayed by the second device.

20. The system of claim 11, wherein the media guidance data comprises parental controls for the second media asset.

* * * * *